(12) United States Patent
Hayes

(10) Patent No.: US 12,673,542 B2
(45) Date of Patent: Jul. 7, 2026

(54) ROBOTIC CRAWLER PLATFORM SYSTEMS AND METHODS

(71) Applicant: Kimberley Anne Hayes, San Antonio, TX (US)

(72) Inventor: Kimberley Anne Hayes, San Antonio, TX (US)

( * ) Notice: Subject to any disclaimer, the term of this patent is extended or adjusted under 35 U.S.C. 154(b) by 332 days.

(21) Appl. No.: 18/084,423

(22) Filed: Dec. 19, 2022

(65) Prior Publication Data

US 2024/0092157 A1 Mar. 21, 2024

Related U.S. Application Data

(60) Provisional application No. 63/409,806, filed on Sep. 25, 2022, provisional application No. 63/291,156, filed on Dec. 17, 2021.

(51) Int. Cl.
B60K 3/00 (2006.01)
B60B 19/00 (2006.01)
(Continued)

(52) U.S. Cl.
CPC .............. B60K 3/00 (2013.01); B60B 19/003 (2013.01); B60B 19/12 (2013.01); F15B 13/044 (2013.01);
(Continued)

(58) Field of Classification Search
CPC ......... B60K 3/00; B60B 19/003; B60B 19/12; F15B 13/044; F15B 2211/3052; F15B 2211/30525; G05D 1/0016
(Continued)

(56) References Cited

U.S. PATENT DOCUMENTS 3,888,360 A 6/1975 Ando et al.
4,223,753 A 9/1980 Bradbury
(Continued)

FOREIGN PATENT DOCUMENTS

CN 109398513 A * 3/2019 ............. B62D 55/04
JP H0493187 A * 8/1990 ............... B08B 9/04

OTHER PUBLICATIONS

Translation of CN-109398513-A accessed on Feb. 8, 2025 at www.espacenet.com (Year: 2019).*
(Continued)

*Primary Examiner* — James A Shriver, II
*Assistant Examiner* — Hilary L Johns
(74) *Attorney, Agent, or Firm* — Franklin & Associates International Inc; Matthew F. Lambrinos

(57) ABSTRACT

A non-electric robotic crawler platform system and method for logically controlling a pneumatically driven multidirectional multi-motor crawler platform in a confined space that can include Zone 0 and 1 spaces. The system can include a robotic crawler platform and an air logic control system. The robotic crawler platform can include wheels and pneumatic motors. The pneumatic motors can be connected to the wheels. Wheels can be polymer, magnetic, rollers, sprockets for track driven system and other motion systems. The air logic control system can be in fluid communication with the pneumatic motors. The robotic crawler platform and the air logic control system are non-electric. The robotic crawler platform and the air logic control system are made from materials having anti-static properties. A user can provide motion control input to the air logic control system to control directional motion of the robotic crawler platform by controlling any one of or any combination of the pneumatic motors in either a forward or reverse rotation direction. Precision can be obtained through flow/pressure controls
(Continued)

either onboard the robotic platform to the motors or exhaust controls plumed exhaust flow regulators from the air piloted shuttle valves.

16 Claims, 26 Drawing Sheets

(51) Int. Cl.

| | | |
|---|---|---|
| *B60B 19/12* | (2006.01) | |
| *F15B 13/044* | (2006.01) | |
| *G05D 1/00* | (2006.01) | |

(52) U.S. Cl.
CPC .... *G05D 1/0016* (2013.01); *F15B 2211/3052* (2013.01); *F15B 2211/30525* (2013.01)

(58) Field of Classification Search
USPC .......................................................... 180/302
See application file for complete search history.

(56) References Cited

U.S. PATENT DOCUMENTS

| | | | |
|---|---|---|---|
| 4,372,161 | A | 2/1983 | de Buda et al. |
| 4,379,335 | A | 4/1983 | Kirsch |
| 4,583,957 | A | 4/1986 | Levy |
| 4,646,787 | A | 3/1987 | Rush et al. |
| 5,350,033 | A | 9/1994 | Kraft |
| 5,890,553 | A | 4/1999 | Bar-Cohen et al. |
| 6,079,285 | A | 6/2000 | Baker et al. |
| 6,702,734 | B2 | 3/2004 | Kim et al. |
| 7,076,335 | B2 | 7/2006 | Seemann |
| 7,182,025 | B2 | 2/2007 | Ghorbel et al. |
| 7,555,966 | B2 | 7/2009 | Bagley et al. |
| 7,594,448 | B2 | 9/2009 | Jacobson et al. |
| 7,640,811 | B2 | 1/2010 | Kennedy et al. |
| 7,788,920 | B2 * | 9/2010 | Keast .................. F15B 11/0426 |
| | | | 60/429 |
| 8,573,076 | B2 | 11/2013 | Sarr et al. |
| 8,899,359 | B1 | 12/2014 | Hafenrichter et al. |
| 8,978,581 | B2 | 3/2015 | Yano |
| 9,395,041 | B2 | 7/2016 | Perla et al. |
| 9,457,466 | B2 | 10/2016 | Robertson et al. |
| 9,664,652 | B2 | 5/2017 | Fetzer et al. |
| 9,817,406 | B1 | 11/2017 | Thielman |
| 10,260,533 | B2 | 4/2019 | Shevchenko et al. |
| 10,539,251 | B2 * | 1/2020 | Galbreath .............. F16K 31/42 |
| 10,589,417 | B2 | 3/2020 | Bastian, II et al. |
| 10,668,626 | B2 | 6/2020 | Wang et al. |
| 10,689,044 | B2 | 6/2020 | Tolley et al. |
| 10,919,176 | B2 | 2/2021 | Siemers |
| 12,038,119 | B2 * | 7/2024 | Akin ....................... F16L 55/40 |
| 2008/0087112 | A1 | 4/2008 | Bagley et al. |
| 2008/0243304 | A1 | 10/2008 | Yoshimi |
| 2009/0158725 | A1 * | 6/2009 | Keast .................. F15B 11/0426 |
| | | | 60/328 |
| 2011/0125462 | A1 | 5/2011 | Petrosky et al. |
| 2014/0210997 | A1 | 7/2014 | Blanchard et al. |
| 2019/0003613 | A1 * | 1/2019 | Galbreath .............. F15B 5/006 |
| 2019/0030714 | A1 | 1/2019 | Knopf et al. |
| 2019/0038091 | A1 | 2/2019 | Nam |
| 2019/0373119 | A1 | 12/2019 | Tokuchi |
| 2021/0016456 | A1 | 1/2021 | Lei et al. |
| 2021/0148503 | A1 | 5/2021 | Fekrmandi et al. |
| 2021/0268663 | A1 | 9/2021 | Gu et al. |
| 2022/0397225 | A1 * | 12/2022 | Akin ................... G01N 21/954 |

OTHER PUBLICATIONS

Translation of JPH0493187A accessed on Feb. 8, 2025 at www.espacenet.com (Year: 1990).*
U.S. Appl. No. 63/409,806, filed Sep. 25, 2022.

* cited by examiner

DETAIL A
SCALE 1 : 2

1006

1001

1002

1004            1004

1002

1004

1005

1006

1005

1005

1005

1005

1006 https://youtu.be/0QR8jU3x3FE

Image available at goBILDA.com

1004

1004

1004

1001

1004

1007

1007

1001

1009 1007

1007

Flow control valve

Quick exhaust valve

1000

1000

| X | CLOSED |
|---|--------|
| O | OPEN |

|  | Forward | Forward Back | Forward Right | Forward Left | Right | Left | Back Right | Back Left | NEUTRAL |
|------|---------|--------------|---------------|--------------|-------|------|------------|-----------|---------|
| 1F | O | X | O | X | O | X | X | X | X |
| 1B | X | O | X | X | X | O | X | O | X |
| 2F | O | X | X | O | X | O | X | X | X |
| 2B | X | O | X | O | O | X | O | X | X |
| 3F | O | X | O | X | O | O | O | X | X |
| 3B | X | O | X | X | O | X | X | X | X |
| 4F | O | X | X | X | O | X | X | X | X |
| 4B | X | O | X | X | X | O | X | O | X |

FIG. 40

ROBOTIC CRAWLER PLATFORM SYSTEMS AND METHODS

CROSS REFERENCE TO RELATED APPLICATIONS

This application claims the benefit of U.S. Provisional Application No. 63/409,806, filed Sep. 25, 2022, and claims the benefit of U.S. Provisional Application No. 63/291,156, filed Dec. 17, 2021, the entire contents of each of which is incorporated herein by reference as if fully set forth herein.

BACKGROUND

Technical Field

One or more embodiments of the present technology relates to a robotic crawler platform, and more particularly but not exclusively, to a robotic crawler platform for use in connection with air logic, the air logic controlling a pneumatically driven multidirectional multi-motor crawler platform. In some embodiments of the present technology, the robotic crawler platform and air logic control does not utilize electronics that could potentially cause a spark. Further, one or more embodiments of the present technology can be utilized in connection with hazardous, Zone 0 or Zone 1 area inspections. One or more embodiments relates to an air logic control system for use with the robotic crawler platform. One or more embodiments relates to methods of operating the robotic crawler platform(s) and air logic control system. One or more embodiments relates to methods of inspection utilizing the robotic crawler platform(s). Some embodiments described in this specification relate generally to automated inspection systems, and more particularly, to remote controlled pneumatic robotic crawler for non-destructive testing of hazardous environments.

Background Description

Many industries utilize confined spaces or Zones (Zones 0-2 and 20-22) for use as a human work area. For example, a confined spaces inspection can require a substantial amount of paperwork prior to and are often cleaned out prior to human entry. A work area can be defined as a confined space if the following criteria are met: 1) limited openings for entry and exit; 2) the space is not intended for continuous human occupancy; and 3) the space is large enough for human entry and to conduct work. An example of a Zone workspace can be Zone 0 which is the assumption that there is always the presence of explosive conditions. These zones present many challenges and safety issues to workers and to industry. Another example of a Zone workspace can be Zone 1 therefore, it should be assumed that any spark or charge build-up could present the source for an ignition/explosion to occur. Additional examples of Zone work spaces are: Zone 2—ignitable concentrations of flammable gases or vapors which are not likely to occur under normal operating conditions and do so only for a short period of time; Zone 20—an area where combustible dusts or ignitable fibers and flyings are present continuously or for long periods of time; Zone 21—an area where combustible dusts or ignitable fibers and flyings are likely to occur under normal operating conditions; and Zone 22—an area where combustible dusts or ignitable fibers and flyings are not likely to occur under normal operating conditions and do so only for a short period of time.

Worker safety is a global concern, with specific attention placed on inspection or servicing in confined spaces in hazardous environments. When addressing the human equity concern of inspection, it is important to keep in mind that millions of workers enter and conduct work in confined spaces annually and around two workers die every week in accidents related to confined spaces. It has been appreciated that around 60% of those fatalities are would-be-rescuers.

There is thus a great need to keep worker safe and to overcome the present disadvantages of current systems or methods when it comes to safety in confined spaces as well as addressing the double fault when it occurs in hazardous environments with Zone 1 or 0. Industry must seek innovation to mitigate this issue whenever possible. Robotic platforms present an advantage in replacing humans, yet few certify explosion proof (Ex) robotic platforms service industry as there are still electronic dependence.

Fluid controlled systems mitigate one of the three requirements for an explosion, the ignition source presented in electronic systems. Two primary fluid systems are in liquid state, hydraulics and air, pneumatics.

Hydraulic drive systems are a nonelectric option and have extensive use in aircraft and heavy utility systems yet have limited deployments in robotic platforms and are often not exclusive hydraulic logic control. Hydraulics' non-compressible state presents a wider adoption over the use of pneumatics when precise control is required and present exponential lifting performance as it can produce 800-900 bars where pneumatics only creates 8-10 bars of pressure.

Pneumatic robots are known that can be utilized in confined spaces, and which may increase worker safety. However, these known robots may not comply with Equipment intended for use in explosive atmospheres (ATEX) and International Electrotechnical Commission System for Certification to Standards Relating to Equipment for Use in Explosive Atmospheres (IECEx) standards or requirements. IECEx is the International Electrotechnical Commission (TEC) System for Certification to Standards Relating to Equipment for Use in Explosive Atmospheres. ATEX or IECEx use quality assessment specifications that are based on International Standards prepared by the IEC and International Organization for Standardization (ISO).

Confined space entry and hazardous carbon fumes present costly and dangerous risks for industry and inspectors. Electronic systems and static discharge concerns need mitigation while presenting access to difficult to access locations. Current inspection process is done with humans in confined spaces, which is dangerous for the asset and the human. Electric motors and static discharging materials are of great concern. The system in design introduces movement without discharge potential. Therefore, what is needed in some embodiments, is a non-destructive pneumatic crawler platform option for inspection platform for solutions.

Furthermore, there are other applications that do not require robots to meet such standards for use in explosive atmospheres or that are not required for use in explosive atmospheres at all, that still require improved robotic crawler platforms and control systems.

SUMMARY

In view of the foregoing disadvantages inherent in the known types of pneumatic robot platforms, one or more embodiments of the present technology provides a novel robotic crawler platform system and method and overcomes one or more of the mentioned disadvantages and drawbacks of the known pneumatic robots. As such, the general purpose of one or more embodiments of the present technology, which will be described subsequently in greater detail, is to provide a new and novel robotic crawler platform system and method which may have the advantages of the known pneumatic robots mentioned heretofore and many novel features that result in a robotic crawler platform system and method which is not anticipated, rendered obvious, suggested, or even implied by the known pneumatic robots, either alone or in any combination thereof.

According to one aspect, one or more embodiments of the present technology can include an apparatus including a robotic crawler platform and an air logic control system. The robotic crawler platform can include wheels and pneumatic motors. The pneumatic motors can be connected to the wheels. The air logic control system can be in fluid communication with the pneumatic motors. Flow and pressure control mitigate one or more stated disadvantages over hydraulics and may present a totally mechanical control system.

In some aspects of the present technology, the robotic crawler platform and the air logic control system are non-electric. In some embodiments, the robotic crawler platform and the air logic control system are made from materials having anti-static properties.

According to another aspect, one or more embodiments of the present technology can include a system including a robotic crawler platform and an air logic control system. The robotic crawler platform can include wheels, pneumatic motors and air logic valves in fluid communication with the pneumatic motors. The pneumatic motors can be connected to the wheels. The air logic control system can be in fluid communication with the air logic valves. In some embodiments, the robotic crawler platform and the air logic control system are non-electric. The robotic crawler platform and the air logic control system may be made from materials having anti-static properties. The air logic valves can be configured to control fluid entering the pneumatic motors based on a pneumatic signal from the air logic control system.

According to some embodiments of the present technology, compensatory measures in communication delays in the fluid controls may be provided in the system to support responsiveness and precision through pressure regulations through the inlet to the motors and flow controls in the exhaust and vice versa. In some embodiments, one or more control valves are in fluid communication with one or more exhaust ports of air logic valves in fluid communication with the pneumatic motors. In some embodiments, the air logic valves comprise throttle valves. In some embodiments, one or more regulators configured in the incoming pneumatic power line.

According to yet another aspect, one or more embodiments of the present technology can include a method of operating an apparatus including a robotic crawler platform and an air logic control system. The method can include the steps of operating the robotic crawler platform in a confined space with the air logic control system exterior of the confined space. Provide one or more user inputs to the air logic control system corresponding to one or more desired motions of the robotic crawler platform to control the pneumatic motors.

In some or all embodiments, the robotic crawler platform can include air logic valves that can be in fluid communication with the pneumatic motors and with the air logic control system.

In some or all embodiments, the air logic valves can be configured to control fluid entering the pneumatic motors based on a pneumatic signal from the air logic control system.

According to some embodiments of the present technology, the method can provide compensatory measures in communication delays in the fluid controls in the system to support responsiveness and precision through pressure regulations through the inlet to the motors and flow controls in the exhaust and vice versa. In some embodiments, the method can further comprise the step of controlling the flow of fluid exhausting from one or more air logic valves in fluid communication with the pneumatic motors to provide directional exhaust restrictions independently to each direction (forward/reverse) of each motor. In some embodiments, the step of controlling the flow of fluid exhausting from one or more air logic valves in fluid communication with the pneumatic motors can comprise controlling, using one or more control valves in fluid communication with one or more exhaust ports the air logic valves, the flow of fluid exhausting from the one or more exhaust ports of the air logic valves. In some embodiments, the air logic valves comprise throttle valves.

In some or all embodiments, the air logic valves can be multi-direction flow control valves each configured to receive a pneumatic power, to receive a forward pneumatic signal from the air logic control system and to receive a reverse pneumatic signal from the air logic control system.

In some or all embodiments, the multi-direction flow control valves can provide the pneumatic power to a forward input of the pneumatic motors upon receiving the forward pneumatic signal and can provide the pneumatic power to a reverse input of the pneumatic motors upon receiving the reverse pneumatic signal.

In some or all embodiments, the air logic control system can comprise shuttle valves in fluid communication with the air logic valves, a user input assembly and a pneumatic source.

In some or all embodiments, the user input assembly can comprise mechanically actuatable valves that provides pneumatic signals to the air logic valves.

In some or all embodiments, the user input assembly can comprise one or more shuttle valves that are in fluid communication with the mechanically actuatable valves and the air logic valves. The shuttle valves can be configured to control the pneumatic signals provided to the air logic valves. In some embodiments, one or more control valves are in fluid communication with one or more exhaust ports of the shuttle valves in fluid communication with the pneumatic motors. In some embodiments, one or more regulators are in the incoming pneumatic power line.

In some or all embodiments, the air logic valves can be multi-direction flow control valves each configured to receive a pneumatic power, to receive a forward pneumatic signal from the air logic control system and to receive a reverse pneumatic signal from the air logic control system.

In some or all embodiments, the multi-direction flow control valves can provide the pneumatic power to a forward input of the pneumatic motors upon receiving the forward pneumatic signal from a forward shuttle valve and can provide the pneumatic power to a reverse input of the pneumatic motors upon receiving the reverse pneumatic signal from a reverse shuttle valve.

Some or all embodiments of the present technology can include a main pneumatic switch in fluid communication with the pneumatic motors. The main pneumatic switch can be configured to control the pneumatic power from the pneumatic source to the multi-direction flow control valves.

Some or all embodiments of the present technology can include a main pneumatic switch in fluid communication with the pneumatic motors. The main pneumatic switch can be configured to control pneumatic power from a pneumatic source to the pneumatic motors.

In some or all embodiments, the air logic control system can be in fluid communication with the pneumatic motors by way of one or more static resistant hoses.

In some or all embodiments, the pneumatic motors can be low revolutions per minute (RPM), high torque pneumatic motors.

In some or all embodiments, the robotic crawler platform and the air logic control system can comply with explosive environmental standards.

In some or all embodiments, the wheels can be selected from the group consisting of omni-directional wheels, roller wheels, magnetic wheels, and drive wheels or sprockets associated with an endless track.

In some or all embodiments, the robotic crawler platform can include a frame configured to use the pneumatic motors, and a deck mountable to the frame.

In some or all embodiments, the wheels are three or more wheels.

In some or all embodiments, the pneumatic motors can be two or more pneumatic motors.

In some or all embodiments, the pneumatic motors can each be in fluid communication with an air logic valve that can include a pneumatic power input, a forward direction input, a forward direction output, a reverse direction input and a reverse direction output.

In some or all embodiments, each forward direction input can be in fluid communication with a forward shuttle valve of the air logic control system. Each reverse direction input can be in fluid communication with a reverse shuttle valve of the air logic control system.

Some or all embodiments of the present technology can include a fine adjustment control valve that can be in fluid communication with one or more of the pneumatic motors and any one of or any combination of a user input assembly, a forward shuttle valve and a reverse shuttle valve. The fine adjustment control valve can be configured to provide forward or reverse control signals to one or more pneumatic motors to provide a turning motion to the robotic crawler platform.

In some or all embodiments, the user input assembly can be one or more push button operated valves or a joystick operated valve.

In some or all embodiments, the robotic crawler platform can further include pneumatic throttle valves in fluid communication with any one of or any combination of the pneumatic motors and air logic valves that are in fluid communication with the pneumatic motors.

Some or all embodiments of the present technology can include a step of providing a pneumatic control signal to one or more of the pneumatic motors from the air logic control system based on the one or more user inputs.

Some or all embodiments of the present technology can include a step of providing pneumatic power to the pneumatic motors from a pneumatic main switch.

Some or all embodiments of the present technology can include a step of providing pneumatic power to the air logic control system from a pneumatic main switch.

In some or all embodiments, the air logic control system can comprise shuttle valves in fluid communication with air logic valves of the robotic crawler platform that are in fluid communication with the pneumatic motors.

Some or all embodiments of the present technology can include a step of providing pneumatic power to a forward input of the pneumatic motors upon receiving a forward pneumatic signal from a forward shuttle valve and providing the pneumatic power to a reverse input of the pneumatic motors upon receiving a reverse pneumatic signal from a reverse shuttle valve.

In some or all embodiments, the method further comprises the step of providing pneumatic power to said pneumatic motors from a pneumatic main switch.

In some or all embodiments, the air logic control system comprises shuttle valves in fluid communication with air logic valves of said robotic crawler platform that are in fluid communication with said pneumatic motors.

In some or all embodiments, the air logic valves are configured to provide pneumatic power to a forward input of said pneumatic motors upon receiving a forward pneumatic signal from a forward shuttle valve and to provide the pneumatic power to a reverse input of said pneumatic motors upon receiving a reverse pneumatic signal from a reverse shuttle valve.

In some embodiments, the air logic control system and/or robotic crawler platform have controls configured to provide pressure and/or flow conditions for accurate direction and drive control of the crawler. In some embodiments, these flow/pressure controls are onboard the robotic platform to the motors and/or or exhaust controls plumed exhaust flow regulators from the air piloted shuttle valves. To this end, in some embodiments, a pressure regulator seen in FIG. 8 and referenced as an R1 controls the incoming pressure to the motor that has a direct relationship to the speed of the motor rotations. There are other methods of controlling the speed with use of flow regulators as seen in FIGS. 7 and 8 as 44a-d. These flow controls restrict the amount of air passing through the hoses that in turn also impact the speed. If the flow control is on the incoming to the motor it can slow the motor, but the better use of the flow controls can be seen in FIG. 8 as they are used in the exhaust. This is notable in that the system maintains pressure throughout the whole system and by regulating the exhaust limits the amount of air that can come into the motors.

According to one aspect, a method comprises providing a robotic crawler platform and air logic controls system of any of the embodiments described herein, controlling with the air logic control system the position of robotic crawler platform in an inspection zone in which there is explosive or potentially explosive conditions are present, and conducting tests/monitoring in the inspection zone using the robotic crawler platform and test/monitoring apparatus carried on said robotic crawler platform.

According to another aspect, there is provided a robotic crawler platform of any one of the embodiments of the robotic crawler platform described herein and/or method of operating such a robotic crawler platform.

According to another aspect, there is provided an air control logic system of any one of the embodiments of the air control logic system described herein and/or method of operating such an air control logic system.

According to another aspect, there is a provide a kit of parts comprising elements of any one or more of the embodiments of the robotic platform crawler and air logic control system mentioned herein, which elements when assembled, provide the robotic platform crawler and air logic control system. The kit of parts may include a box in which said elements are stored together with an instruction manual, the instruction manual providing instructions on how to assembly the elements together to provide said robotic platform crawler and air logic control system. According to yet some other embodiments of the present technology, there is provided an automated pneumatic remote controlled robotic crawler or nondestructive testing of hazardous environments. In some embodiments, automated static mitigating pneumatic remote controlled robotic crawler is disclosed for non-destructive testing of hazardous environments is provided. In some embodiments, the automated low to no-static pneumatic remote controlled robotic crawler comprises multi-directional flow control valves for flow through hoses to independent pneumatic motors attached to four independent rotary motors connected to omnidirectional wheels interchangeable with direct drive wheels when increased traction is required.

According to some embodiments, the automated low-static pneumatic remote controlled robotic crawler for non-destructive testing of hazardous environments comprises: a crawler main base unit; a top plate disposed above the crawler main unit made of anti-static polymer; axle bushings; a base block for controls; four independent omnidirectional Mecanum wheels attached to the crawler main unit via the axle bushings; pneumatic motor to power the movement; a frame to which the components attach; a plurality of valves, hoses; and a joystick manipulation control system dispensed through four four-way solenoid control system to control flow from the pneumatic motor to the omnidirectional wheels.

There has thus been outlined, rather broadly, features of the present technology in order that the detailed description thereof that follows may be better understood and in order that the present contribution to the art may be better appreciated.

Numerous objects, features, and advantages of one or more embodiments of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of one or more of the embodiments of the present technology to provide a new and novel robotic crawler platform system and method that may have the advantages of the known pneumatic robots' pneumatic controllers and omit at least one or more of the disadvantages.

It is another object of one or more embodiments of the present technology to provide a new and novel robotic crawler platform system and method that may be easily and efficiently manufactured and marketed.

An even further object of one or more embodiments of the present technology is to provide a new and novel non-electric robotic crawler platform system and method that has a low cost of manufacture with regard to both materials and labor, and which accordingly is then susceptible of low prices of sale to the consuming public, thereby making such non-electric robotic crawler platform system and method economically available to the buying public.

Still another object of one or more embodiments of the present technology is to provide a new robotic crawler platform system and method that provides in the apparatuses and methods of the known pneumatic robots some of the advantages thereof, while simultaneously overcoming some of the disadvantages normally associated therewith.

These together with other objects of one or more embodiments of the present technology, along with the various features of novelty that characterize the present technology, are pointed out with particularity in the claims annexed to and forming a part of this disclosure. For a better understanding of the one or more embodiments of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that one or more embodiments of the present technology may meet only one such object or none at all.

BRIEF DESCRIPTION OF THE DRAWINGS

The one or more embodiments of the present technology will be better understood and objects other than those set forth above will become apparent when consideration is given to the following detailed description thereof. Such description makes reference to the annexed drawings wherein:

FIG. 40 is a schematic and corresponding table illustrating Mecanum wheels and directional control sequencing according to some embodiments for the crawler of FIG. 11.

The same reference numerals refer to the same parts throughout the various figures.

DETAILED DESCRIPTION OF THE EMBODIMENTS

Figure 1:
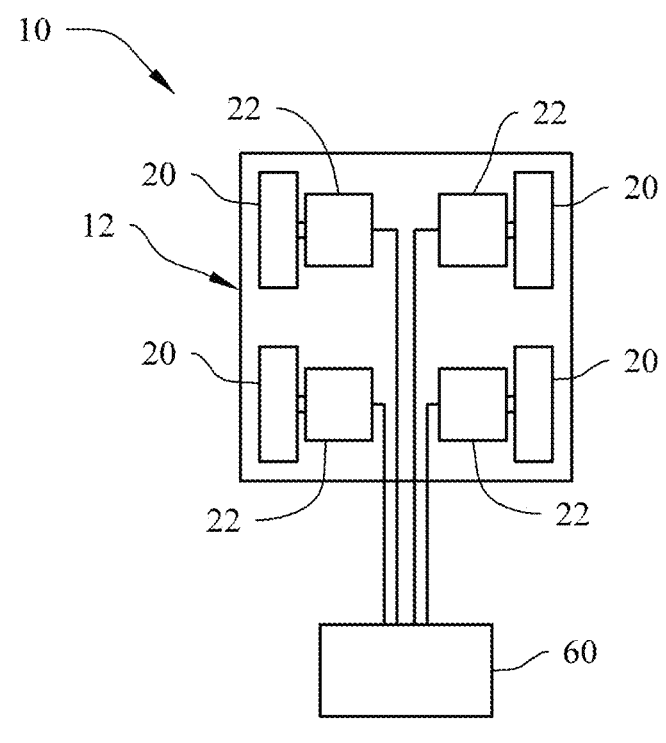
FIG. 1 is a block diagram of one embodiment of the present technology including the non-electric robotic crawler platform and the non-electric air logic control system.

In the following description, for purposes of explanation and not limitation, specific details are set forth, such as particular embodiments, procedures, techniques, etc. in order to provide a thorough understanding of one or more embodiments of the present technology. However, it will be apparent to one skilled in the art that one or more embodiments of the present technology may be practiced in other embodiments that depart from these specific details.

Referring now to the drawings, and particularly to FIGS. 1-8, one or more embodiments of the non-electric robotic crawler platform system and method of the present technology is shown and generally designated by the reference numeral 10.

Referring to FIG. 1, a new and novel non-electric robotic crawler platform system and method 10 of the present technology for logically controlling a pneumatically driven multidirectional multi-motor crawler platform is illustrated and will be described. One or more embodiments of the present technology 10 can include a non-electric robotic crawler platform 12 and a non-electric air logic control system 60. The robotic crawler platform 12 can include wheels 20 and pneumatic motors 22, where the pneumatic motors 22 are connected to the wheels 20. The air logic control system 60 can be in fluid communication with the pneumatic motors 22.

The robotic crawler platform 12, the pneumatic motors 22 and the air logic control system 60 are non-electric. Further, the robotic crawler platform 12 and the air logic control system 60 are made from materials having anti-static or static dispersive properties.

It can be appreciated that a user can provide motion control input to the air logic control system 60 to control directional motion of the robotic crawler platform 12 by controlling any one of or any combination of the pneumatic motors 22 in either a forward or reverse rotational direction.

It can further be appreciated that any suitable number of wheels, 20, can be utilized, and any suitable number of pneumatic motors 22 can be utilized to provide any desired directional control. It can be further appreciated that a total number of wheels 20 does not have to correspond with a total number of the pneumatic motors 22. It can still further be appreciated that the motors 22 can be in any operable connection to the wheels 20 such as, but not limited to, direct or indirect connection via a shaft, a gear reduction system, a pulley system, a magnetic system or any other suitable means of providing rotational motion to the wheels.

As stated above, confined space entry and hazardous fumes present costly and dangerous risks for industry and inspectors. Static discharge concerns need mitigation while presenting access to difficult to access locations. In the exemplary, one or more embodiments of the preset technology for non-destructive testing of hazardous environments described herewith solve such problems by a pneumatic remote-controlled solution for inspection by a low to no-static robotic crawler platform 12. Pneumatic remote-controlled solutions may elevate utility and present a way to the necessary inspection in a safe and automated way through low to no-static robots.

Known pneumatically powered robots or platform vehicles have been used in assembly/production, but often with electric solenoid controls. One or more embodiments of the present technology can overcome at least this disadvantage in the total use of air logic sequencing from mechanical positioning controls in the air logic control system 60 then traveling through to the pneumatic motors 22 in a means to ensure adequate exhausting and distribution.

One advantage of one or more embodiments of the present technology is in its non-electric, entirely pneumatic controls through air logic. This allows for one of the primary components for an explosion, which being an ignition source, to be mitigated where flammable gasses and/or liquids are present. Another advantage of one or more embodiments of the present technology is that the robotic crawler platform 12 is sized for confined spaces, which is normally inspected with human entry.

In particular, some or all embodiments of the present technology can replace the need for humans to enter confined spaces to conduct inspections. This is dangerous for the asset and the human (fumes, etc.). Also, electric motors and static discharging materials are of great concern. One or more embodiments of the present technology introduces movement without discharge potential by way of the pneumatic motors 22. The pneumatic motors 22 can be, but not limited to, high torque, low revolutions per minute (RPM) pneumatic motors. In the exemplary, the pneumatic motors 22 can be configured or operated to provide a minimum speed controlled to be below thresholds in the potential for impact ignition. Speed can also be managed via incoming pressure regulators and/or exhaust control.

In addition, one or more embodiments of the present technology improve upon the currently existing options by eliminating the use of electric motors and/or electric solenoids which, in and around static discharging materials, are of great concern. Specifically, static discharge in electric motors and solenoids is a highly dangerous possibility with the existing options. Add these concerns to the existing human safety concerns (fumes, etc.) and it can be appreciated that the existing inspection process done with humans in small spaces is too dangerous for both human and assets being inspected, due to the potential electric discharge by electronic motor movements. One or more embodiments of the present technology introduces movement without discharge potential and can potentially be utilized for more frequent and varied deployments as some of the extra cleaning processes save time/money. In some or all of the embodiments, the present technology brings the human back in a data review mode versus direct access.

Still further, one or more embodiments of the present technology can be configured to comply with, but not limited to, IEC 60079-0, EN IEC 60079-0, IEC ISO 80079-36, EN ISO 80079-36, IEC ISO 80079-37, EN ISO 80079-37 and/or ISO/IEC 80079-34 standards.

A need exists for a new and novel non-electric robotic crawler platform system and method 10 that can be used for logically controlling a pneumatically driven multidirectional multi-motor crawler platform. In this regard, one or more embodiments of the present technology substantially fulfills this need. In this respect, the non-electric robotic crawler platform system and method according to one or more embodiments of the present technology substantially departs from the conventional concepts and designs of known systems, and in doing so provides an apparatus primarily developed for the purpose of logically controlling a pneumatically driven multidirectional multi-motor crawler platform.

Figure 2A:
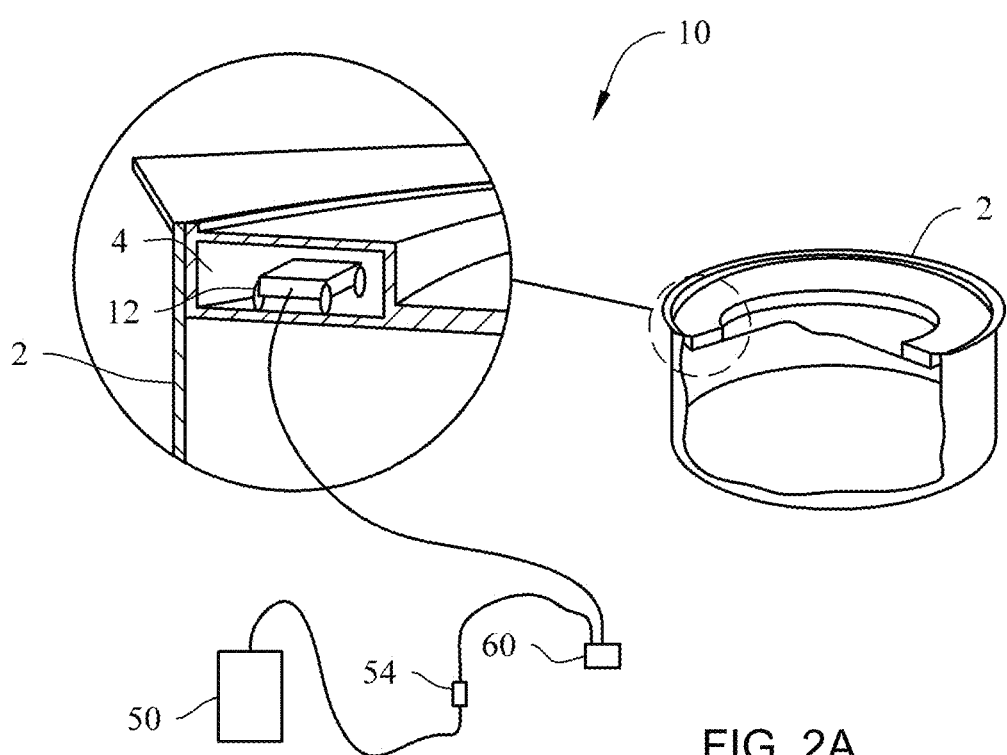
FIG. 2 is an enlarged perspective cutaway view of the non-electric robotic crawler platform system shown in an exemplary use in enclosed spaces within a steel storage tank. The system can also be used in many other applications where confined spaces and/or hazardous environments.
FIG. 2B is an enlarged perspective cutaway view of the non-electric robotic crawler platform system shown in an exemplary use in enclosed spaces within a steel storage tank according to some embodiments.
Figure 2B:
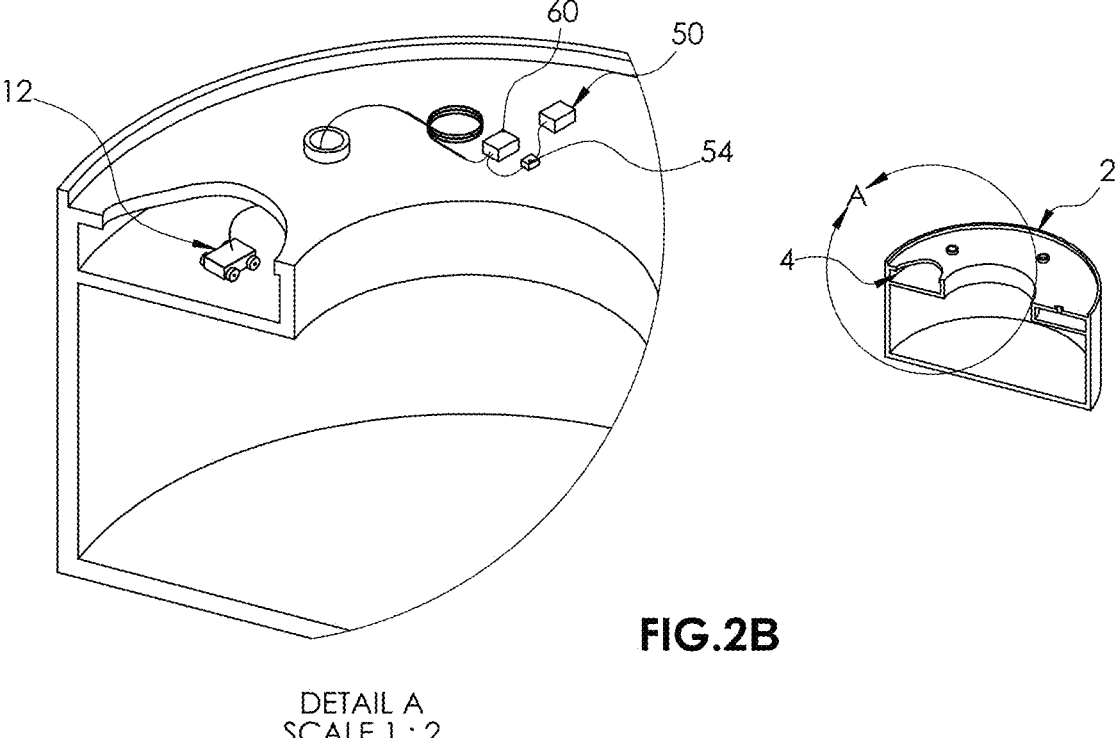

In FIG. 2, one or more embodiments of the present technology 10 can be utilized in providing and/or controlling the non-electric robotic crawler platform 12 in a confined space 4 of a structure or building 2. In the exemplary, the structure or building can be a storage tank 2, and the confined space 4 can be a Zone 0 or 1 space. The robotic crawler platform 12 can include wheels 20 and the pneumatic motors 22 operably connected to the wheels 20 in a configuration capable of operation in a confined spaced, as best illustrated in FIG. 2.

The robotic crawler platform 12 and the air logic control system 60 can include any other static mitigating components or means in combination with the anti-statice or static dispersive material.

One or more embodiments of the present technology can further include a pneumatic source 50 and a main pneumatic switch 54. The pneumatic source 50 can be, but not limited to, an air pump, an air compressor, a pressurized air storage tank or any suitable source of air. The pneumatic source 50 can be in fluid communication with the main pneumatic switch 54, which can provide the pneumatic power such as, but not limited, pressurized air to the air logic control system 60 to provide pressurized air thereto. It can be appreciated that one or more of the embodiments of the present technology can utilize pressurized hydraulic instead of air.

One or more embodiments of the present technology can further include the pneumatic source 50 in fluid communication with the main pneumatic switch 54 and the air logic control system 60.

The robotic crawler platform 12, the main pneumatic switch 54 and the air logic control system 60 can all be non-electric, where no electrical power is provided thereto and/or transmitted therefrom, thereby complying with Zone 0 or 1 requirements. Even further, the robotic crawler platform 12, the main pneumatic switch 54 and the air logic control system 60 can all be made from or with statice dispersive or anti-static materials.

Figures 3, 4:
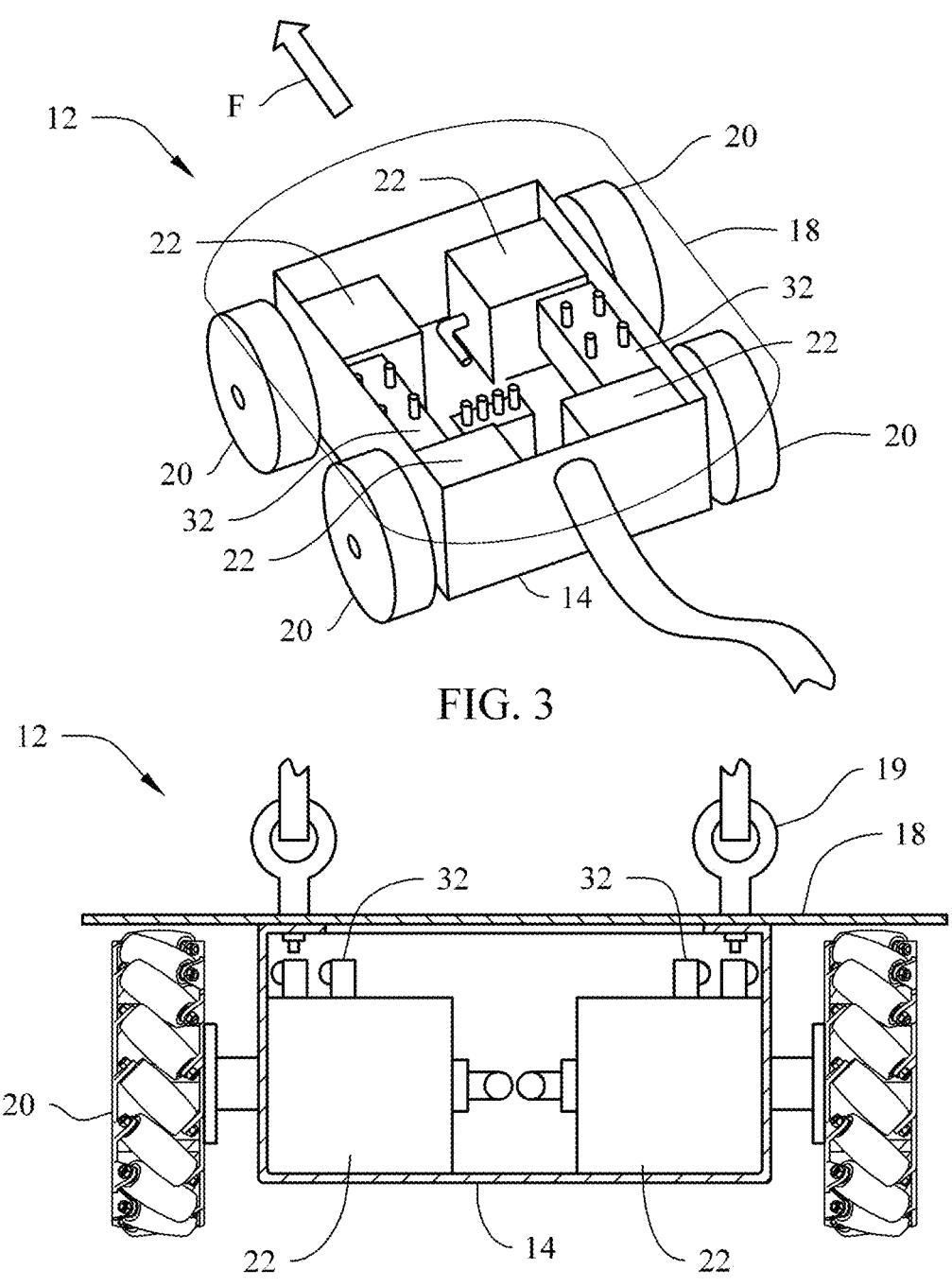
FIG. 3 is a perspective view of the robotic crawler platform of one or more embodiments of the present technology.
FIG. 4 is a cross-sectional view of the robotic crawler platform with the deck attached thereto and includes omnidirection wheels.
Figure 5:
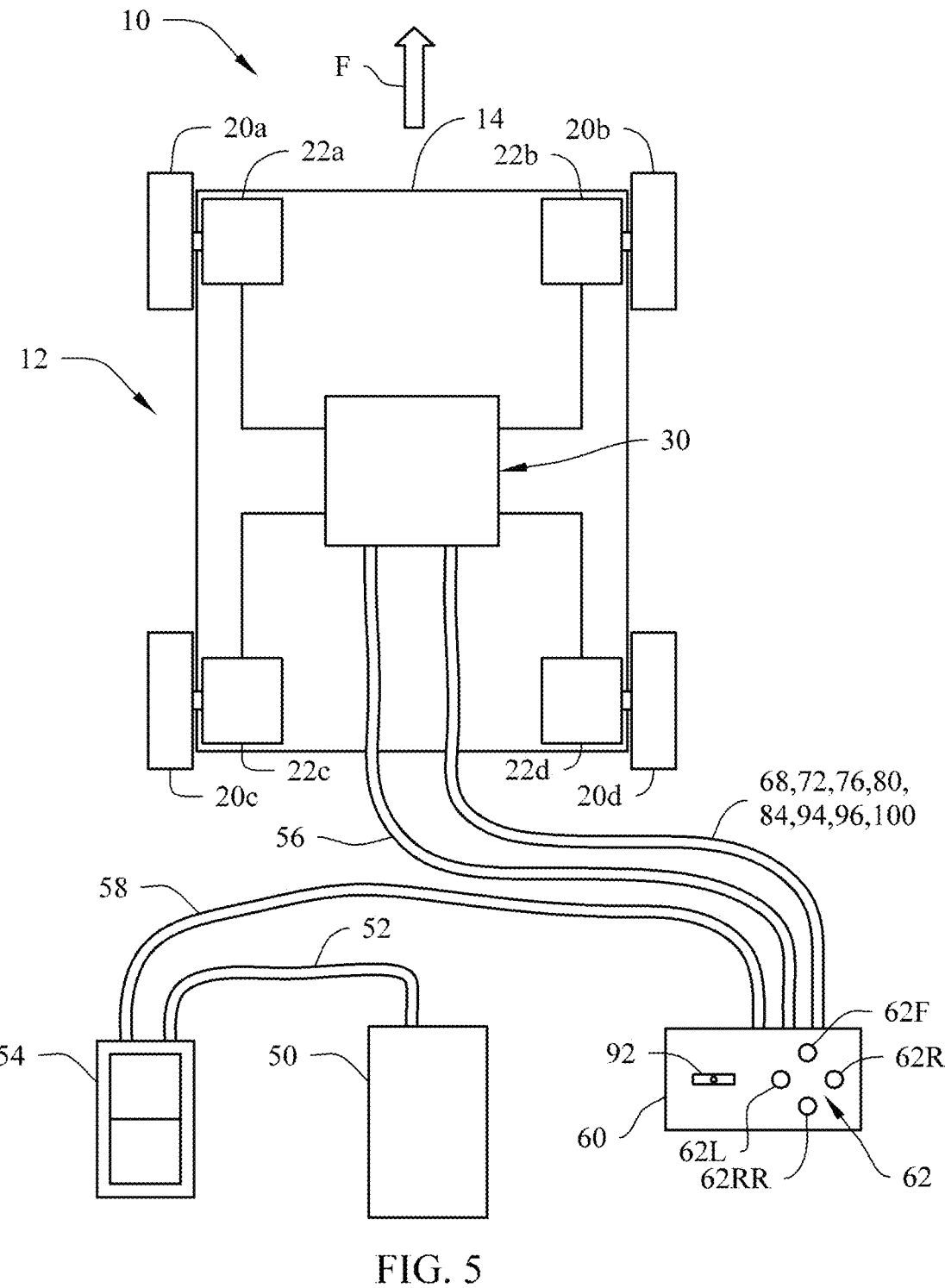
FIG. 5 is a block diagram of the robotic crawler platform, the pneumatic or air source, the control box and the main air switch of one or more embodiments of the present technology. Button sequence controller configuration. Two-lever controller is an option (not represented in this drawing). Block diagram represents on robot exhaust, but exhaust return to control box is another option with flow regulators for remote speed control (not illustrated).

Referring to FIGS. 3-5, the robotic crawler platform 12 can include wheels 20 and a pneumatic motor 22 operably connected to at least one of the wheels 20. It can be appreciated that any number of wheels 20 and/or pneumatic motors 22 can be utilized in one or more embodiments of the present technology. It can further be appreciated that the wheels 20 can be, but not limited to, an omni-directional wheel (as best illustrated in FIG. 4), a roller wheel, a magnetic wheel, or a drive wheel or sprocket associated with an endless track. A robot frame 14 can be utilized to support the wheels 20 and the pneumatic motor 22 and can house a pneumatic control system 30 associated with the robotic crawler platform 12.

The pneumatic control system 30 can include any pneumatic component suitable for operation of the pneumatic motors such as, but not limited to, air logic valves 32, throttle valves or any other suitable pneumatic control devices. It can be appreciated that one or more embodiments of the present technology can include the air logic valves 32 being remote from the robotic crawler platform 12 and connected to the pneumatic motors 22 by way of suitably length hoses.

The robotic crawler platform 12 can move in all directions by operating any one of or any combination of the pneumatic motors 22. The wheels 20 can be executed with magnetic rollers which will provide grip to the rollers on a metallic surface, such as those associated with the confined space 4 of the steel tank 2.

A deck 18 can be attachable to the frame 14 to provide a support platform for additional equipment, tools, inspection components and the like. The deck 18 can be attached by or can include eye bolts or loops 19 that are capable of receiving straps that can be utilized to carry the robotic crawler platform 12.

The robotic crawler platform 12 can be equipped with a pneumatic actuator or cylinder (not shown) on which various tools can be mounted. These tools can be, but not limited to, inspection tools, sensor systems, ultrasonic (UT) sensor systems, thickness measurement devices, welding equipment or cameras. Additional control inputs can be utilized with the air logic control system 60 to provide pneumatic signals to the pneumatic actuator and/or the tool. It can be appreciated that all components of the robotic crawler platform 12 and any payload or tool associated with the robotic crawler platform 12 can have their own individual ATEX or EX approval.

Referring to FIG. 5, one or more embodiments of the present technology can utilize user inputs provided to the air logic control system 60 that would accordingly provide pneumatic signals to the pneumatic control system 30 which controls pressurized air from the pneumatic source 50 to any one of or any combination of the pneumatic motors 22, which thus drives their corresponding wheel 20.

The user can input desired motion control of the robotic crawler platform 12 to the air logic control system 60 by way of non-electric inputs such as, but not limited to, buttons, levers, joysticks, knobs and the like.

Figure 6:
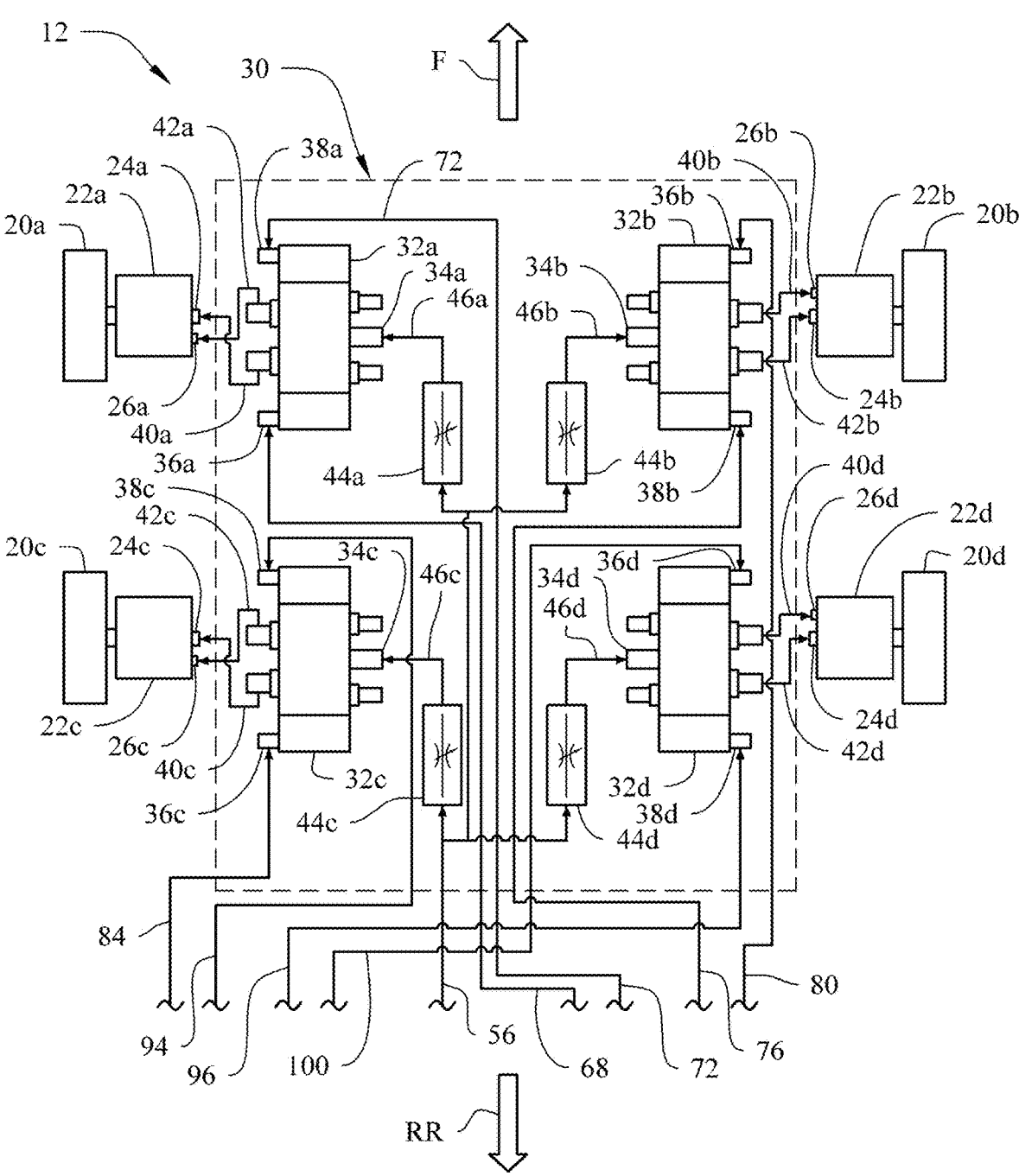
FIG. 6 is a block diagram of the four pneumatic motor robot platform and the air logic control system of one or more embodiments of the present technology.
Figure 6:
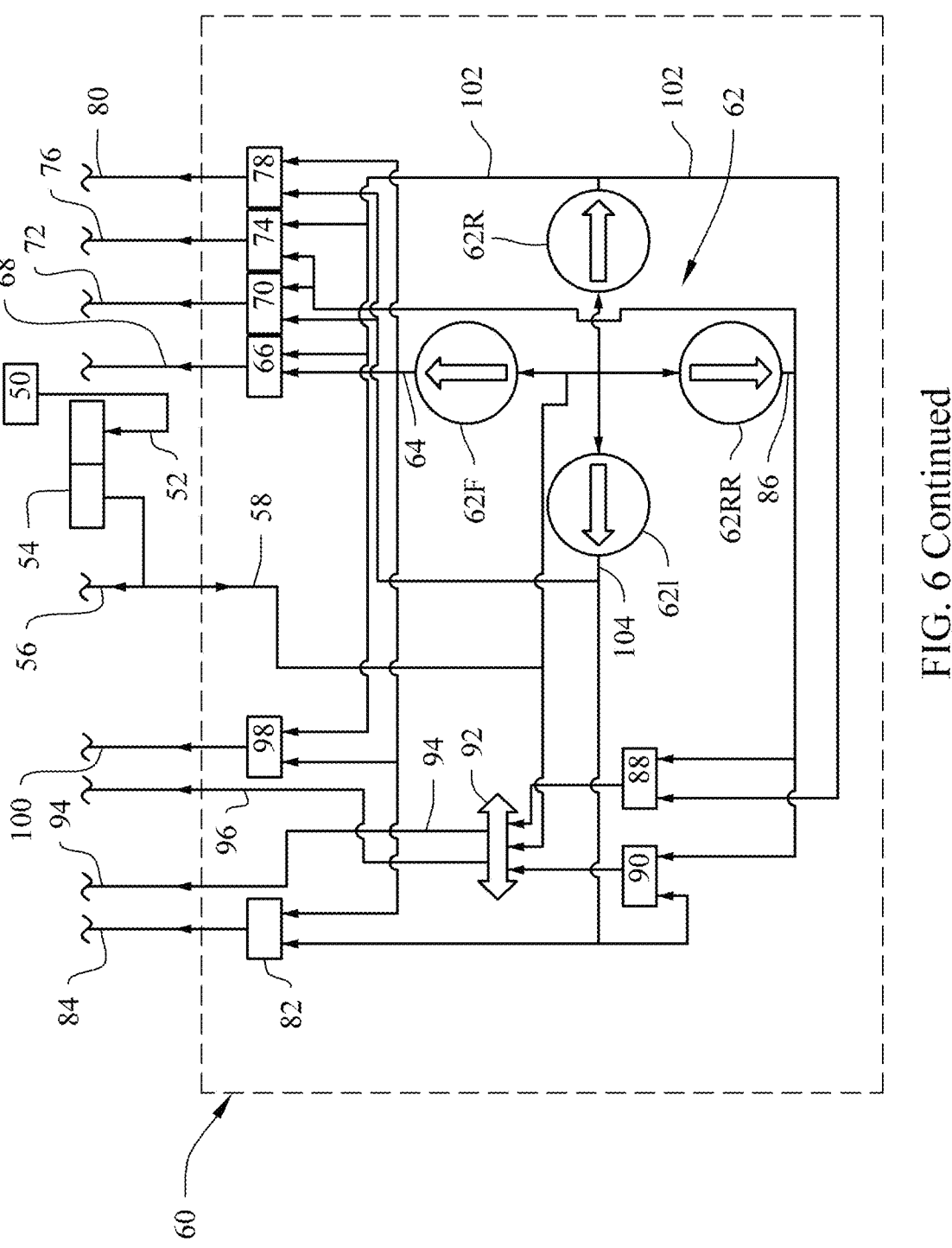

Referring to FIG. 6, a non-limiting example of the robotic crawler platform 12 including four pneumatic motor driven wheels is illustrated and described. However, other wheel and pneumatic motor configurations can be implemented in the scope of the present technology. In this embodiment, the robotic crawler platform 12 can include four wheels 20a, 20b, 20c, 20d, each connected to a pneumatic motor 22a, 22b, 22c, 22d. Each pneumatic motor 22a, 22b, 22c, 22d includes a forward direction input 24a, 24b, 24c, 24d and a reverse direction input 26a, 26b, 26c, 26d. The first pneumatic motor 22a being a front-left side motor, the second pneumatic motor 22b being a front-right side motor, the third pneumatic motor 22c being a rear-left side motor and the fourth pneumatic motor 22d being a rear-right side motor. It can be appreciated that the second and fourth pneumatic motors 22b, 22d are inversely orientated as to the first and third pneumatic motors 22a, 22c. With this in mind, the first and third pneumatic motors 22a, 22c and the second and fourth pneumatic motors 22b, 22d are oriented on the robotic crawler platform 12 so that they provide operable rotational direction of their corresponding wheels 20a, 20b, 20c, 20d.

Sequencing for desired directional control can be summarized in the simplified flow progression from control box 60 to crawler 10 can be seen in Table 1 and correspond with flow diagram in FIG. 6.

TABLE 1

| Communication signal sequences for directional controls (FIG. 6) | | | | | | |
|---|---|---|---|---|---|---|
| Motor | Directional Input Line | Input Port | Motor Input Line | Motor Input Port | Motor Direction | Platform Direction |
| 22a | 72 | 38a | 42a | 26a | Reverse | Reverse |
| 22a | 68 | 36a | 40a | 24a | Forward | Forward |
| 22b | 80 | 36b | 40b | 26b | Reverse | Forward |

TABLE 1-continued

| Communication signal sequences for directional controls (FIG. 6) | | | | | | |
|---|---|---|---|---|---|---|
| Motor | Directional Input Line | Input Port | Motor Input Line | Motor Input Port | Motor Direction | Platform Direction |
| 22b | 76 | 38b | 42b | 24b | Forward | Reverse |
| 22c | 94 | 38c | 42c | 26c | Reverse | Reverse |
| 22c | 84 | 36c | 40c | 24c | Forward | Forward |
| 22d | 100 | 36d | 40d | 26d | Reverse | Forward |
| 22d | 96 | 38d | 42d | 24d | Forward | Reverse |

For example, to move the robotic crawler platform 12 forward, the forward direction input 24a, 24c of the first and third pneumatic motors 22a, 22c, and the reverse direction input 26b, 26d of the second and fourth pneumatic motors 22b, 22d are operated.

The air logic valves 32 can be, but not limited to, air piloted valves or multi-direction flow control valves 32a, 32b, 32c, 32d that can be in fluid communication with the forward direction input 24a, 24b, 24c, 24d and the reverse direction input 26a, 26b, 26c, 26d. These multi-direction flow control valves 32a, 32b, 32c, 32d can receive pneumatic control signals from the air logic control system 60 to control the motive rotational direction of the motors 22a-d, respectively, thereby moving the robotic crawler platform 12 in a desired direction. These flow control valves 32a-d can act as switches that manage an input from the air logic control system 60 that sequences the pneumatic power to the forward direction inputs 24a, 24b, 24c, 24d and the reverse direction inputs 26a, 26b, 26c, 26d on the motors 22a, 22b, 22c, 22d, respectively.

A first and third motor forward direction output 40a, 40c of the multi-direction flow control valve 32a, 32c can be connected to the forward direction input 24a, 24c of the first and third pneumatic motors 22a, 22c, and a first and third reverse direction output 42a, 42c can be connected to the reverse direction input 26a, 26c of the first and third pneumatic motors 22a, 22c, respectively. It can be appreciated that one or more embodiments of the present technology can include the first and third motor forward direction outputs 40a, 40c with lengths allowing for their corresponding flow control valves 32a, 32c to be remote from the robotic crawler platform 12.

Inversely to the above, a second and fourth motor forward direction output 40b, 40d of the flow control valve 32b, 32d can be connected to the reverse direction input 26b, 26d of the second and fourth pneumatic motors 22b, 22d, and a second and fourth reverse direction output 42b, 42d can be connected to the forward direction input 24b, 24d of the second and fourth pneumatic motors 22b, 22d, respectively. It can be appreciated that one or more embodiments of the present technology can include the second and fourth motor forward direction outputs 40b, 40d with lengths allowing for their corresponding flow control valves 32b, 32d to be remote from the robotic crawler platform 12.

Each flow control valve 32a, 32b, 32c, 32d can include a forward signal input 36a, 36b, 36c, 36d and a reverse signal input 38a, 38b, 38c, 38d, utilized to receive pneumatic control signals from the air logic control system 60 to control which of the forward direction output 40a, 40b, 40c, 40c or the reverse direction output 42a, 42b, 42c, 42d is activated or opened.

In an idle operation, the pneumatic power from the main pneumatic switch 54 is prevented from passing to the any of the direction inputs 24a-d, 26a-d of the pneumatic motor 22a-d until a pneumatic signal is received in one of the forward signal inputs 36a-d or the reverse signal inputs 38a-d from the air logic control system 60. In operation, the pneumatic power is allowed to pass to either the forward direction inputs 24a-d or the reverse direction inputs 26a-d of the pneumatic motors 22a-d depending on which of the forward signal inputs 36a-d or the reverse signal inputs 38a-d receives a pneumatic signal.

The flow control valves 32a, 32b, 32c, 32d can be, but not limited to, 5-way three position (left, right, neutral) valves that can control the pneumatic power going into either the forward direction input 24a, 24b, 24c, 24d or the reverse direction input 26a, 26b, 26c, 26d of their respective pneumatic motors 22a, 22b, 22c, 22d based on the pneumatic signal received by either the forward signal input 36a, 36b, 36c, 36d or the reverse signal input 38a, 38b, 38c, 38d.

Pneumatic power utilized to drive the pneumatic motors 22a, 22b, 22c, 22d can be received through a main pneumatic input 34a, 34b, 34c, 34d of the flow control valves 32a, 32b, 32c, 32d provided by the pneumatic source 50 by way of the main pneumatic switch 54. When the main pneumatic switch 54 is not activated, the pneumatic power is not allowed to pass through the pneumatic switch 54, thereby preventing the pneumatic motors 24a-d and/or the air logic control system 60 from being operated. Exhaust ports can be utilized in each of the flow control valves 32a, 32b, 32c, 32d to allow air exiting the pneumatic motors 22a, 22b, 22c, 22d to escape.

A pneumatic throttle valve 44a, 44b, 44c, 44d can be utilized to control the pneumatic power to each of the main pneumatic inputs 34a, 34b, 34c, 34d. Each throttle valve 44a, 44b, 44c, 44d can be connected to each the main pneumatic inputs 34a, 34b, 34c, 34d by way of a throttle line 46a, 46b, 46c, 46d. The pneumatic throttle valve 44a, 44b, 44c, 44d can be, but not limited to a speed controller or pneumatic flow control valve that can be used for controlling the operation speed of pneumatic motor 22a, 22b, 22c, 22d. The flow rate of air or hydraulic from an input side to an output side of the throttle valves 44a-d can be controlled.

The main pneumatic switch 54 can receive pneumatic power directly from the pneumatic source 50 by way of line 52, and then output the pneumatic power to the throttle valves 44a-d by way of line 56. In the exemplary, the pneumatic power line 56 from the main pneumatic switch 54 to the robotic crawler platform 12 can be, but not limited to, a static resistant 6 mm hose or line. The main pneumatic switch 54 can be, but not limited to, a foot operated pedal, a hand operated lever, a push button or any user operated device that can stop or allow the pneumatic power to pass therethrough.

The air logic control system 60 is in fluid communication with each of the flow control valves 32a, 32b, 32c, 32d and the throttle valves 44a, 44b, 44c, 44d, and can include a user input assembly 62 allowing a user to control the movement and/or operation of the robotic crawler platform 12.

The pneumatic power from the main pneumatic switch 54 can be further provided to the user input assembly 62 and to an optional fine adjustment control valve 92 by way of line 58. It can thus be appreciated that the pneumatic source 50 provides the pneumatic power that operates each of the pneumatic motors 22a, 22b, 22c, 22d as well as to the air logic control system 60 by way of the main pneumatic switch 54.

Alternatively, the pneumatic power from the pneumatic source 50 can be provided directly to the user input assembly 62 and to the optional fine adjustment control valve 92 by way of the line 58, which can by-pass the man pneumatic switch 54. It can thus be appreciated that the pneumatic source 50 provides the pneumatic power that operates each of the pneumatic motors 22a, 22b, 22c, 22d as well as to the air logic control system 60.

The user input assembly 62 can be, but not limited to, one or more buttons or a joystick capable of controlling the pneumatic control signals to the flow control valves 32a, 32b, 32c, 32d. In the exemplary, the user input assembly 62 will herein be described as a four-button system including a forward button 62F, a right button 62R, a reverse button 62RR and a left button 62L. It can be appreciated that this configuration can be implemented with a joystick or any other mechanically controlled valves. The buttons 62F, 62R, 62RR, 62L can be, but not limited to, 3-way two position (neutral, open) button-controlled valves. It can be appreciated that the user input assembly 62 can provide the pneumatic control signal to one or more appropriate motor shuttle valves to provide the desired motion of the robotic crawler platform 12. A shuttle valve can be a type of valve which allows fluid to flow through it from one of two sources. The desired motion can be a forward direction as indicated by the arrow F, a right direction, a reverse direction indicated by the arrow RR and a left direction. All directions can be provided by controlling the forward or reverse operation of any one of or any combination of the first pneumatic motor 22a, the second pneumatic motor 22b, the third pneumatic motor 22c and the fourth pneumatic motor 22d.

The forward control button 62F can receive the pneumatic power from line 58 and upon activation provide a forward motion pneumatic control signal, by way of lines 64, to a first motor forward shuttle valve 66, a second motor forward shuttle valve 78, a third motor forward shuttle valve 82 and a fourth motor forward shuttle valve 98.

The pneumatic control signal from the first motor forward shuttle valve 66 is provided to the forward signal input 36a of the first motor flow control valve 32a by way of line 68, consequently providing pneumatic power to the forward direction input 24a of the first motor 22a (forward rotational direction).

The pneumatic control signal from the second motor forward shuttle valve 78 is provided to the reverse signal input 38b of the second motor control valve 32b by way of line 80, consequently providing pneumatic power to the reverse direction input 26b of the second motor 22b (forward rotational direction). Further, the pneumatic control signal from the third motor forward shuttle valve 82 is provided to the forward signal input 36c of the third motor flow control valve 32c by way of line 84, consequently providing pneumatic power to the forward direction input 24c of the third motor 22c (forward rotational direction). Still further, the pneumatic control signal from the fourth motor forward shuttle valve 98 is provided to the forward signal input 36d of the fourth motor flow control valve 32d by way of line 100, consequently providing pneumatic power to the reverse direction input 26d of the fourth motor 22d (forward rotational direction).

The right button 62R can receive the pneumatic power from line 58 and upon activation provide a right motion pneumatic control signal, by way of lines 102, to the first motor forward shuttle valve 66, a second motor reverse shuttle valve 74, a third motor reverse shuttle valve 88 and the fourth motor forward shuttle valve 98.

The pneumatic control signal from the first motor forward shuttle valve 66 is provided to the forward signal input 36a of the first motor flow control valve 32a by way of line 68, consequently providing pneumatic power to the forward direction input 24a of the first motor 22a (forward rotational direction).

The pneumatic control signal from the second motor reverse shuttle valve 74 is provided to the reverse signal input 38b of the second motor flow control valve 32b by way of line 76, consequently providing pneumatic power to the reverse direction input 26b of the second motor 22b (reverse rotational direction).

The pneumatic control signal from the third motor reverse shuttle valve 88 is provided to the fine adjustment control valve 92, which provides a pneumatic control signal to the reverse signal input 38c of the third motor flow control valve 32c by way of line 94, consequently providing pneumatic power to the reverse direction input 26c of the third motor 22c (reverse rotational direction). It can be appreciated that pneumatic signals can pass through the fine adjustment control valve 92 without disruption unless operated.

The pneumatic control signal from the fourth motor forward shuttle valve 98 is provided to the reverse signal input 38d of the fourth motor flow control valve 32d by way of line 100, consequently providing pneumatic power to the reverse direction input 26d of the fourth motor 22d (forward rotational direction).

The fine adjustment control valve 92 can be a 5-way three position (left, right, neutral) valve controlled by a user activated left-right joystick or push buttons, which can be utilized to make fine left or right motion adjustments to the robotic crawler platform 12 by operating the third pneumatic motor 22C and/or the fourth pneumatic motor 22d.

The reverse control button 62RR can receive the pneumatic power from line 58 and upon activation provide a reverse motion pneumatic control signal, by way of lines 86, to a first motor reverse shuttle valve 70, the second motor reverse shuttle valve 74, the third motor reverse shuttle valve 88 and a fourth motor reverse shuttle valve 90.

The pneumatic control signal from the first motor reverse shuttle valve 70 is provided to the reverse signal input 38a of the first motor flow control valve 32a by way of line 72, consequently providing pneumatic power to the reverse direction input 26a of the first motor 22a (reverse rotational direction). Further, the pneumatic control signal from the second motor reverse shuttle valve 74 is provided to the reverse signal input 38b of the second motor flow control valve 32b by way of line 76, consequently providing pneumatic power to the forward direction input 24b of the second motor 22b (reverse rotational direction).

The pneumatic control signal from the third motor reverse shuttle valve 88 is provided to the fine adjustment control valve 92, which provides a pneumatic control signal to the reverse signal input 38c of the third motor flow control valve 32c by way of line 94, consequently providing pneumatic power to the reverse direction input 26c of the third motor 22c (reverse rotational direction). It can be appreciated that pneumatic signals can pass through the fine adjustment control valve 92 without disruption unless operated.

The pneumatic control signal from the fourth motor reverse shuttle valve 90 is provided to the fine adjustment control valve 92, which provides a pneumatic control signal to the reverse signal input 38d of the fourth motor flow control valve 32d by way of line 96, consequently providing pneumatic power to the forward direction input 24d of the fourth motor 22d (reverse rotational direction). It can be appreciated that pneumatic signals can pass through the fine adjustment control valve 92 without disruption unless operated.

It can be appreciated that a portion of the pneumatic control signal from the reverse button 62RR is provided to both the third motor reverse shuttle valve 88 and the fourth motor reverse shuttle valve 90, which is then provided to the fine adjustment control valve 92, which is then provided to the reverse signal input 38c of the third motor flow control valve 32c by way of line 94 and to the reverse signal input 38d of the fourth motor flow control valve 32d by way of line 96.

The left button 62L can receive the pneumatic power from line 58 and upon activation provide a left motion pneumatic control signal, by way of lines 104, to the first motor reverse shuttle valve 70, the second motor forward shuttle valve 78, the third motor forward shuttle valve 82 and the fourth motor reverse shuttle valve 90.

The pneumatic control signal from the first motor reverse shuttle valve 70 is provided to the reverse signal input 38a of the first motor flow control valve 32a by way of line 42, consequently providing pneumatic power to the reverse direction input 26a of the first motor 22a (reverse rotational direction).

The pneumatic control signal from the second motor forward shuttle valve 78 is provided to the forward signal input 36b of the second motor flow control valve 32b by way of line 80, consequently providing pneumatic power to the forward direction input 24b of the second motor 22b (forward rotational direction).

The pneumatic control signal from the third motor forward shuttle valve 82 is provided to the forward signal input 36c of the third motor flow control valve 32c by way of line 84, consequently providing pneumatic power to the forward direction input 24c of the third motor 22c (forward rotational direction).

The pneumatic control signal from the fourth motor reverse shuttle valve 90 is provided to the fine adjustment control valve 92, which provides a pneumatic control signal to the reverse signal input 38d of the fourth motor flow control valve 32d by way of line 96, consequently providing pneumatic power to the forward direction input 24d of the fourth motor 22d (reverse rotational direction). It can be appreciated that pneumatic signals can pass through the fine adjustment control valve 92 without disruption unless operated.

With the above in mind, it can be appreciated that a four-motor robotic crawler platform can include at least eight motor shuttle valves 66, 70, 74, 78, 82, 88, 90, 98, equaling to two shuttle valves per motor. It can be further appreciated that the motor shuttle valves can act as an OR logic switch, which only provides one pneumatic signal 68, 72, 76, 80, 84, 94, 96, 100 to their respective multi-direction flow control valves based on the position or operation of the user input assembly 62F, 62R, 62RR, 62L. In the exemplary, the lines 68, 72, 76, 80, 84, 94, 96, 100 that provide the pneumatic signals to the robotic crawler platform 12 can be, but not limited to, a static resistant 4 mm hose or line.

As such, the air logic control system 60 can provide a forward or right pneumatic signal to the first motor forward signal input 36a by way of the first motor forward shuttle valve 66, and a reverse or left pneumatic signal to the first motor reverse signal input 38a by way of the first motor reverse shuttle valve 70.

The air logic control system 60 can provide a forward or left pneumatic signal to the second motor forward signal input 36b by way of the second motor forward shuttle valve 78, and a reverse or right pneumatic signal to the second motor reverse signal input 38b by way of the second motor reverse shuttle valve 74.

The air logic control system 60 can provide a forward or left pneumatic signal to the third motor forward signal input 36*c* by way of the third motor forward shuttle valve 82, and a reverse or right pneumatic signal to the third motor reverse signal input 38*c* by way of the third motor reverse shuttle valve 88 and the fine adjustment control valve 92.

The air logic control system 60 can provide a forward or right pneumatic signal to the fourth motor forward signal input 36*d* by way of the fourth motor forward shuttle valve 98, and a reverse or left pneumatic signal to the fourth motor reverse signal input 38*d* by way of the fourth motor reverse shuttle valve 90 and the fine adjustment control valve 92.

In use, it can now be understood that pneumatic power provided by the pneumatic source 50 can be supplied to the main pneumatic switch 54, which can then provide the pneumatic power to the air logic control system 60 and to the pneumatic motors 22*a-d*. It can be appreciated that the pneumatic motors 22*a-d* and the air logic control system 60 will not operate unless the main pneumatic switch 54 is operated in combination with a pneumatic signal being provided to any one of or any combination of the flow control valve 32*a-d* by the air logic control system 60. Alternatively, the pneumatic power from the pneumatic source 50 can be supplied to the main pneumatic switch 54 and to the air logic control system 60 independently, with the pneumatic main switch 54 controlling the pneumatic power to the pneumatic motors 22*a-d*.

Forward, right, reverse and left motion of the robotic crawler platform 12 can be controlled by the operation of the pneumatic motors 22*a-d*, and more specifically by the providing of a pneumatic control signal to one of their respective forward direction input 24*a-d* or reverse direction input 26*a-d*. Table 2 provides a representation of some of the different motions capable of the robotic crawler platform 12 as compared with operation of its corresponding motor forward direction input 24*a-d* or reverse direction input 26*a-d*. The below table shows the sequencing of pneumatic power to its appropriate motor input, with the second and fourth motors 22*b*, 22*d* being an inverse of the first and third motors 22*a*, 22*c*. With this in mind, a forward motion of the second and fourth motors 22*b*, 22*d* can be provided by supplying pneumatic power to their corresponding reverse inputs 26*b*, 26*d*.

pressing the forward button 62F, then pneumatic signals are provided to the first motor forward shuttle valve 66, the second motor forward shuttle valve 78, the third motor forward shuttle valve 82 and the fourth motor forward shuttle valve 98. Accordingly, a pneumatic signal is then permitted to flow to the forward signal input 36*a*, 36*c* of the first and third motor flow control valves 32*a*, 32*c* that results in the first and third pneumatic motors 22*a*, 22*c* to move their corresponding wheel 20*a*, 20*c* in a forward direction. Further, a pneumatic signal is also permitted to flow to the reverse signal input 38*b*, 38*d* of the second and fourth motor flow control valves 32*b*, 32*d* that results in the second and fourth pneumatic motors 22*b*, 22*d* to operate in a reverse direction as compared to the first and third pneumatic motors 22*a*, 22*c* resulting in their corresponding wheel 20*b*, 20*d* to move in a forward direction. Consequently, resulting in the robotic crawler platform 12 to move forward.

While the main pneumatic switch 54 is activated, it can be appreciated that if a user provides a right motion input to the user input assembly 62, for example by pressing the right button 62R, then pneumatic signals are provided to the first motor forward shuttle valve 66, the second motor reverse shuttle valve 74, the third motor reverse shuttle valve 88 and the fourth motor forward shuttle valve 98. Accordingly, a pneumatic signal is then permitted to flow to the forward signal input 36*a*, 36*d* of the first and fourth motor flow control valves 32*a*, 32*d* that results in the first and fourth pneumatic motors 22*a*, 22*d* to move their corresponding wheel 20*a*, 20*d* in a forward direction. Further, a pneumatic signal is also permitted to flow to the reverse signal input 38*b*, 38*c* of the second and third motor flow control valves 32*b*, 32*c* that results in the second and third pneumatic motors 22*b*, 22*c* to move their corresponding wheel 20*b*, 20*c* in a reverse direction. It can be appreciated that the pneumatic signal provided to the third motor reverse shuttle valve 88 is capable of passing through the fine adjustment control valve 92 to the third motor reverse input 38*c*. Consequently, resulting in the robotic crawler platform 12 to slide or crawl to the right.

While the main pneumatic switch 54 is activated, it can be appreciated that if a user provides a reverse motion input to the user input assembly 62, for example by pressing the reverse button 62RR, then pneumatic signals are provided to

TABLE 2

| | 1st Motor Forward Input | 1st Motor Reverse Input | 2nd Motor Forward Input | 2nd Motor Reverse Input | 3rd Motor Forward Input | 3rd Motor Reverse Input | 4th Motor Forward Input | 4th Motor Reverse Input |
|---|---|---|---|---|---|---|---|---|
| Forward | X | | | X | X | | | X |
| Reverse | | X | X | | | X | X | |
| Right | X | | X | | | X | | X |
| Left | | X | X | | X | | X | |

The above representation provides a left or right motion that corresponds to a slide or crawl motion utilizing omni-directional wheels, which is substantially a motion perpendicular to a forward motion of the robotic crawler platform 12. Further, the use of omni-directional wheels can allow the robotic crawler platform 12 the ability to move in diagonal directions upon appropriate operation of one or more specific pneumatic motors 22*a-d*.

While the main pneumatic switch 54 is activated to allow pneumatic power to be provided to the flow control valves 32*a-d*, it can be appreciated that if a user provides a forward motion input to the user input assembly 62, for example by the first motor reverse shuttle valve 70, the second motor reverse shuttle valve 74, the third motor reverse shuttle valve 88 and the fourth motor reverse shuttle valve 90. Accordingly, a pneumatic signal is then permitted to flow to the reverse signal input 38*a*, 38*b* of the first and second motor flow control valves 32*a*, 32*b* that results in the first and second pneumatic motors 22*a*, 22*b* to move their corresponding wheel 20*a*, 20*b* in a reverse direction. Further, a pneumatic signal is also permitted to flow to the reverse signal input 38*c*, 38*d* of the third and fourth motor reverse shuttle valves 88, 90 that results in the third and fourth pneumatic motors 22*c*, 22*d* to move those results in their corresponding wheel 20c, 20d in a reverse direction. It can be appreciated that the pneumatic signals provided to the third and fourth motor reverse shuttle valves 88, 90 is capable of passing through the fine adjustment control valve 92 to their respective third and fourth motor reverse input 38c, 38d. Consequently, resulting in the robotic crawler platform 12 moving in reverse.

While the main pneumatic switch 54 is activated, it can be appreciated that if a user provides a left motion input to the user input assembly 62, for example by pressing the left button 62L, then pneumatic signals are provided to the first motor reverse shuttle valve 70, the second motor forward shuttle valve 78, the third motor forward shuttle valve 82 and the fourth motor reverse shuttle valve 90. Accordingly, a pneumatic signal is then permitted to flow to the forward signal input 36b, 36c of the second and third motor flow control valves 32b, 32c that results in the second and third pneumatic motors 22b, 22c to move their corresponding wheel 20b, 20c in a forward direction. Further, a pneumatic signal is also permitted to flow to the reverse signal input 38a, 38d of the first and fourth motor flow control valves 32a, 32d that results in the first and fourth pneumatic motors 22a, 22d to move their corresponding wheel 20a, 20d in a reverse direction. It can be appreciated that the pneumatic signal provided to the fourth motor reverse shuttle valve 90 is capable of passing through the fine adjustment control valve 92 to the fourth motor forward input 36d. Consequently, resulting in the robotic crawler platform 12 to slide or crawl to the left.

Additionally, the pneumatic motors 22a-d can be operated to provide a left and right turning motion utilizing any type of wheels, as shown in Table 3. This turning motion can be a zero turn or a forward/reverse motioned turn. It can be appreciated that these additional turning motions can be possible with the above represented omni-wheels.

TABLE 3

|  | 1st Motor Forward Input | 1st Motor Reverse Input | 2nd Motor Forward Input | 2nd Motor Reverse Input | 3rd Motor Forward Input | 3rd Motor Reverse Input | 4th Motor Forward Input | 4th Motor Reverse Input |
|---|---|---|---|---|---|---|---|---|
| Right | X |  | X |  |  | X |  | X |
| Left |  | X | X |  |  | X | X |  |

It can be appreciated that any combination of any of the motors 22a-d along with any combination of rotational direction of any of the motors 22a-d can be utilized to provide any degree of turning with or without a forward or reverse motion component.

Operation of the fine adjustment control valve 92 can provide the operation of only the third or fourth pneumatic motors 22c, 22d to provide small incremental turning movement of the robotic crawler platform 12, as shown in Table 4.

TABLE 4

|  | 3rd Motor Forward Input | 3rd Motor Reverse Input | 4th Motor Forward Input | 4th Motor Reverse Input |
|---|---|---|---|---|
| Right |  |  | X |  |
| Left |  | X |  |  |

Figure 7:
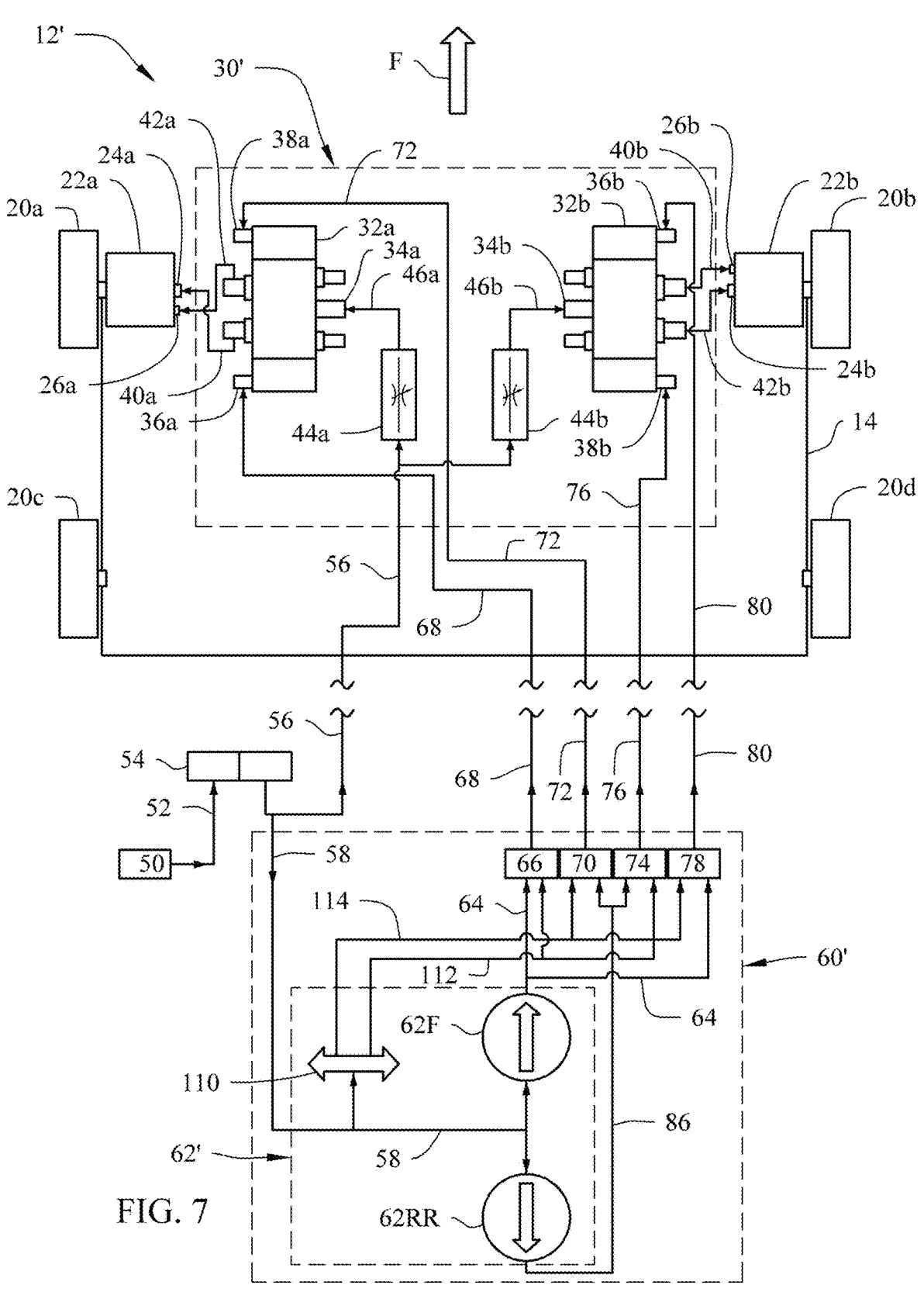
FIG. 7 is a block diagram of the two pneumatic motor robot platform and the air logic control system of one or more embodiments of the present technology.

Referring to FIG. 7, an example of the robotic crawler platform 12' including two pneumatic motor driven wheels and an alternate embodiment air logic control system 60' is illustrated and described. In this embodiment, the robotic crawler platform 12' can include the four wheels 20a, 20b, 20c, 20d, with the front-right wheel 20a and the front-left wheel 20b each being connected to a pneumatic motor 22a, 22b. The pneumatic motors 22a, 22b include the same forward direction inputs 24a, 24b and the same reverse direction inputs 26a, 26b as described above. It can be appreciated that the second pneumatic motor 22b is inversely orientated as to the first pneumatic motor 22a.

The air logic control system 60' is in fluid communication with each of the flow control valves 32a, 32b and the throttle valves 44a, 44b of a pneumatic valve system 30' of the robotic crawler platform 12'. The air logic control system 60' can include a user input assembly 62' allowing a user to control the movement and/or operation of the robotic crawler platform 12'.

The user input assembly 62' can be, but not limited to, one or more buttons or a joystick capable of controlling the pneumatic control signals to the multi-direction flow control valves 32a, 32b. In the exemplary, the user input assembly 62' of the air logic control system 60' will be described as a two-button system including a forward button 62F and a reverse button 62RR, and a joystick 110 for providing left and right motion control signals. It can be appreciated that the joystick 110 can be implemented as left and right buttons, or the forward and reverse buttons 62F, 62RR can be implemented as a joystick or as part of the joystick 110. The buttons 62F, 62RR can be, but not limited to, 3-way two position (neutral, open) button-controlled valves. It can be appreciated that the user input assembly 62' can provide the pneumatic control signal to the appropriate motor shuttle valves 66, 70, 74, 78 to provide the desired motion of the robotic crawler platform 12'. The desired motion can be a forward direction as indicated by the arrow F, a right direction, a reverse direction and a left direction. All directions can be provided by controlling the forward or reverse operation of any one of or any combination of the first pneumatic motor 22a and the second pneumatic motor 22b.

The pneumatic power from the pneumatic source 50 is further provided to the user input assembly 62' and to the joystick 110 by way of line 58. It can thus be appreciated that the pneumatic power from the pneumatic source 50 is provided as the pneumatic power that operates the pneumatic motors 22a, 22b as well as to the air logic control system 60'.

The forward control button 62F can receive the pneumatic power from line 58 and upon activation provide a forward motion pneumatic control signal, by way of lines 64, to the first motor forward shuttle valve 66 and the second motor forward shuttle valve 78.

The pneumatic control signal from the first motor forward shuttle valve 66 is provided to the forward signal input 36a of the first motor flow control valves 32a by way of line 68, consequently providing pneumatic power to the forward direction input 24a of the first motor 22a (forward rotational direction). Further, the pneumatic control signal from the second motor forward shuttle valve 78 is provided to the forward signal input 36*b* of the second motor flow control valves 32*b* by way of line 80, consequently providing pneumatic power to the reverse direction input 26*b* of the second motor 22*b* (forward rotational direction).

The reverse control button 62RR can receive the pneumatic power from line 58 and upon activation provide a reverse motion pneumatic control signal, by way of lines 86, to the first motor reverse shuttle valve 70 and the second motor reverse shuttle valve 74.

The pneumatic control signal from the first motor reverse shuttle valve 70 is provided to the reverse signal input 38*a* of the first motor flow control valves 32*a* by way of line 72, consequently providing pneumatic power to the reverse direction input 26*a* of the first motor 22*a* (reverse rotational direction). Further, the pneumatic control signal from the second motor reverse shuttle valve 74 is provided to the reverse signal input 38*b* of the second motor flow control valves 32*b* by way of line 76, consequently providing pneumatic power to the forward direction input 24*b* of the second motor 22*b* (reverse rotational direction).

The joystick 110 can be a 3-way three position (left, right, neutral) valve that provides a right pneumatic control signal or a left pneumatic control signal. The joystick 110 can receive the pneumatic power from line 58 and upon a right motion activation provide the right motion pneumatic control signal, by way of line 112, to the first motor forward shuttle valve 66 and the second motor reverse shuttle valve 74, consequently providing pneumatic power to the forward direction input 24*a* of the first motor 22*a* (forward rotational direction) and to the forward direction input 24*b* of the second motor 22*b* (reverse rotational direction).

Upon a left motion activation, the joystick 110 can provide the left motion pneumatic control signal, by way of line 114, to the first motor reverse shuttle valve 70 and the second motor forward shuttle valve 78, consequently providing pneumatic power to the reverse direction input 26*a* of the first motor 22*a* (reverse rotational direction) and to the reverse direction input 26*b* of the second motor 22*b* (forward rotational direction).

With the above in mind, it can be appreciated that a two-motor robotic crawler platform 12' can include at least four motor shuttle valves 66, 70, 74, 78, equaling to two shuttle valves per motor. It can be further appreciated that the motor shuttle valves can act as an OR logic switch, which only provides one pneumatic signal 68, 72, 76, 80 to their respective flow control valves based on the position or operation of the user input assembly 62F, 62RR, 110.

As such, the air logic control system 60' can provide a forward or right pneumatic signal to the first motor forward signal input 36*a* by way of the first motor forward shuttle valve 66, and a reverse or left pneumatic signal to the first motor reverse signal input 38*a* by way of the first motor reverse shuttle valve 70.

The air logic control system 60' can provide a forward or left pneumatic signal to the second motor forward signal input 36*b* by way of the second motor forward shuttle valve 78, and a reverse or right pneumatic signal to the second motor reverse signal input 38*b* by way of the second motor reverse shuttle valve 74.

In use, it can now be understood that pneumatic power provided by the pneumatic source 50 can be supplied to the main pneumatic switch 54, which can then provide the pneumatic power to the air logic control system 60' and to the pneumatic motors 22*a*, 22*b*. It can be appreciated that the pneumatic motors 22*a*, 22*b* and the air logic control system 60 will not operate unless the main pneumatic switch 54 is operated in combination with a pneumatic signal being provided to any one of or any combination of the flow control valve 32*a*, 32*b* by the air logic control system 60'. Alternatively, the pneumatic power from the pneumatic source 50 can be supplied to the main pneumatic switch 54 and to the air logic control system 60 independently, with the pneumatic main switch 54 controlling the pneumatic power to the pneumatic motors 22*a-d*.

Forward, right, reverse and left motion of the robotic crawler platform 12' can be controlled by the operation of the pneumatic motors 22*a*, 22*b*, and more specifically by the providing of a pneumatic control signal to one of their respective motor forward direction input 24*a*, 24*b* or reverse direction input 26*a*, 26*b*. Table 5 provides a representation of some of the different motions of the robotic crawler platform 12' as compared with operation of its corresponding motor forward direction input 24*a*, 24*b* or reverse direction input 26*a*,26*b*. The below table shows the sequencing of pneumatic power to its appropriate motor input, with the second motor 22*b* being an inverse of the first motor 22*a*. With this in mind, a forward motion of the second motor 22*b* can be provided by supplying pneumatic power to its corresponding reverse input 26*b*.

TABLE 5

| | 1st Motor Forward Input | 1st Motor Reverse Input | 2nd Motor Forward Input | 2nd Motor Reverse Input |
|---|---|---|---|---|
| Forward | X | | | X |
| Reverse | | X | X | |
| Right | X | | | X |
| Left | | X | X | |

While the main pneumatic switch 54 is activated to allow pneumatic power to be provided to the flow control valves 32*a*, 32*b*, it can be appreciated that if a user provides a forward motion input to the user input assembly 62', for example by pressing the forward button 62F, then pneumatic signals are provided to the first motor forward shuttle valve 66 and the second motor forward shuttle valve 78. Accordingly, a pneumatic signal is then permitted to flow to the forward signal input 36*a*, 36*b* of the first and second motor flow control valves 32*a*, 32*b* that results in the first and second pneumatic motors 22*a*, 22*b* to move their corresponding wheel 20*a*, 20*b* in a forward direction. Consequently, resulting in the robotic crawler platform 12' to move forward.

While the main pneumatic switch 54 is activated, it can be appreciated that if a user provides a right motion input to the user input assembly 62', for example by moving the joystick 110 to the right, then pneumatic signals are provided to the first motor forward shuttle valve 66 and the second motor reverse shuttle valve 74. Accordingly, a pneumatic signal is then permitted to flow to the forward signal input 36*a* of the first motor flow control valve 32*a* that results in the first pneumatic motor 22*a* to move its corresponding wheel 20*a* in a forward direction. Further, a pneumatic signal is also permitted to flow to the reverse signal input 36*b* of the second motor flow control valve 32*b* that results in the second pneumatic motor 22*b* to move its corresponding wheel 20*b* in a reverse direction. Consequently, resulting in the robotic crawler platform 12' to move to the right.

While the main pneumatic switch 54 is activated to allow pneumatic power to be provided to the flow control valves 32*a*, 32*b*, it can be appreciated that if a user provides a reverse motion input to the user input assembly 62', for example by pressing the reverse button 62RR, then pneumatic signals are provided to the first motor reverse shuttle valve 70 and the second motor reverse shuttle valve 74. Accordingly, a pneumatic signal is then permitted to flow to the reverse signal input 38a, 38b of the first and second motor flow control valves 32a, 32b that results in the first and second pneumatic motors 22a, 22b to move their corresponding wheel 20a, 20b in a reverse direction. Consequently, resulting in the robotic crawler platform 12' to move in reverse.

While the main pneumatic switch 54 is activated, it can be appreciated that if a user provides a left motion input to the user input assembly 62', for example by moving the joystick 110 to the left, then pneumatic signals are provided to the first motor reverse shuttle valve 70 and the second motor forward shuttle valve 78. Accordingly, a pneumatic signal is then permitted to flow to the reverse signal input 38a of the first motor flow control valve 32a that results in the first pneumatic motor 22a to move its corresponding wheel 20a in a reverse direction. Further, a pneumatic signal is also permitted to flow to the forward signal input 36b of the second motor flow control valve 32b that results in the second pneumatic motor 22b to move its corresponding wheel 20b in a forward direction. Consequently, resulting in the robotic crawler platform 12' to move to the left.

Additionally, the pneumatic motors 22a, 22b can be operated to provide a left and right turning motion, as shown in Table 6. This turning motion can be implemented by operating only one of the first or second pneumatic motors 22a, 22b.

TABLE 6

| | 1st Motor Forward Input | 1st Motor Reverse Input | 2nd Motor Forward Input | 2nd Motor Reverse Input |
|---|---|---|---|---|
| Right | X | | | |
| Left | | X | | |
| | | OR | | |
| Right | | | | X |
| Left | | | X | |

It can be appreciated that any one of or any combination of the first and second motors 22a, 22b along with any combination of rotational direction of the first and second motors 22a, 22b can be utilized to provide any degree of turning with or without a forward or reverse motion component.

With reference to the above-described four motor and two motor configurations, it can be appreciated that any combination of the above describe buttons 62F, 62K 62RR, 62L and/or joysticks 92, 110 can be operated independently or simultaneously, thereby providing varying degrees of controlled operation of any one of or any combination of the pneumatic motors 22a-d.

Figure 8:
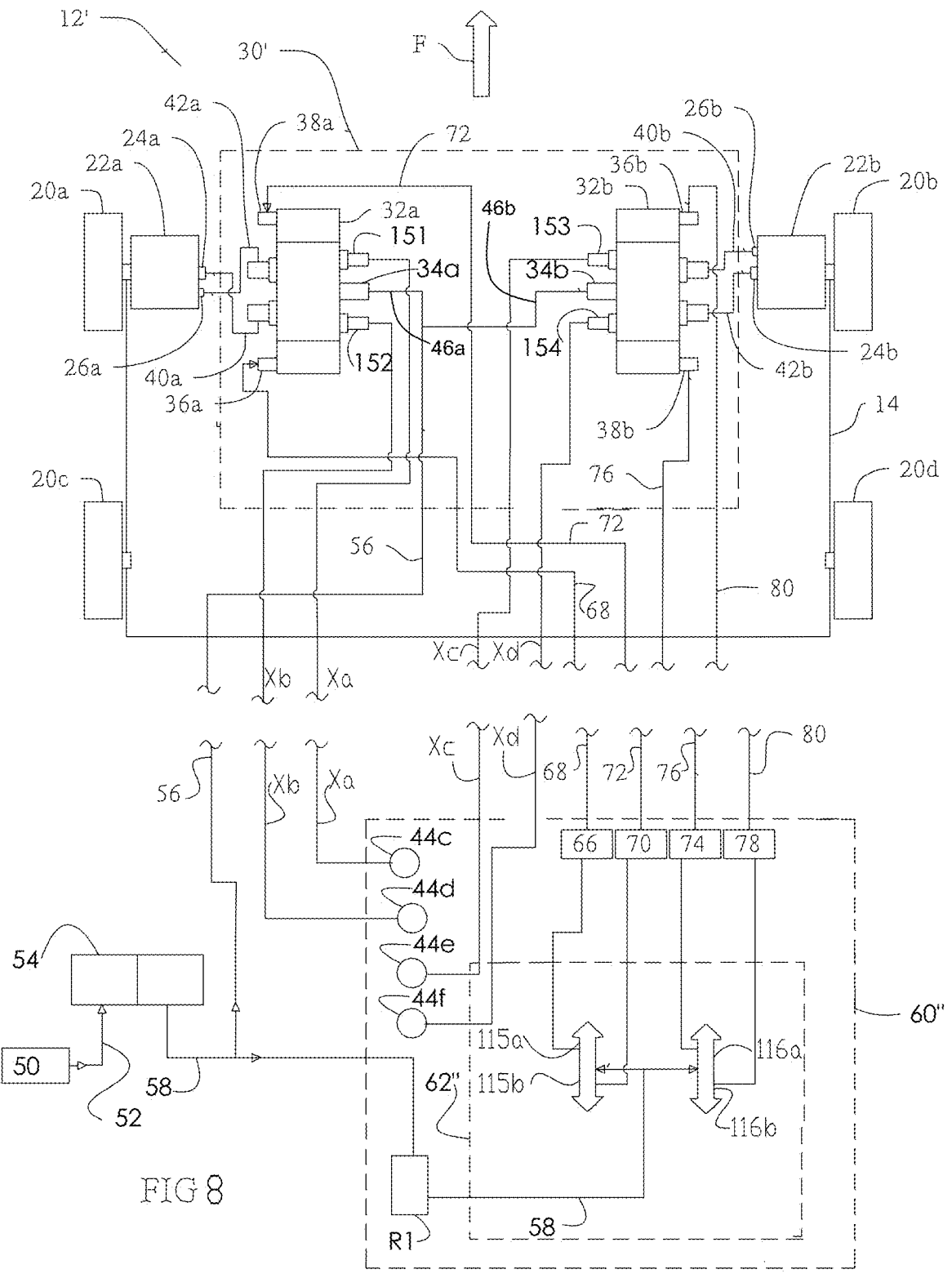
FIG. 8 is a block diagram of the two pneumatic motor robot platform and an air logic control system of some embodiments of the present technology.

Referring to FIG. 8, a system according to some other embodiments s of the present technology having a robotic crawler platform 12' configuration including two pneumatic motor driven wheels and an alternate embodiment air logic control system 60" is illustrated and described. In these embodiments, the robotic crawler platform 12' includes the two wheels 20a, 20b with the front-left wheel 20a and the front-right wheel 20b each being connected to a pneumatic motor 22a, 22b. The pneumatic motors 22a, 22b include the same forward direction inputs 24a, 24b and the same reverse direction inputs 26a, 26b as described above. It can be appreciated that the second pneumatic motor 22b is inversely orientated as to the first pneumatic motor 22a.

The forward motion can be received by the pneumatic power from line 58 and upon activation provide a forward motion pneumatic control signal, by way of lines 56, to the first motor forward shuttle valve 66 and the second motor forward shuttle valve 74. It can be appreciated that a flow regulator input flow control R1 may or may not be included on incoming airline to motor outputs 46a to port 34a for left motor 2a and 46b to 34b on motor 2b. In some embodiments, R1 may be a pressure regulator. For the purpose of this specification, the flow pressure regulator is a device that controls the pressure of liquids or gasses by reducing a high input pressure to a lower output pressure. It produces a constant output pressure even when fluctuations in the inlet pressure occur.

The R1 can be independently connected through incoming lines 58 and configured to present equally defined pressure to each motor or can be presented in two separate R1s in direct fluid communication with incoming air pressure to the motors independently.

Onboard control box 60" there are four communication ports 66, 70, 74 and 78. The pneumatic control signal from the first motor forward shuttle valve 66 is provided to the forward signal input 36a of the first motor flow control valves 32a by way of line 68, consequently providing pneumatic power to the forward direction input 24a of the first motor 22a (forward rotational direction). Further, the pneumatic control signal from the second motor forward shuttle valve 74 is provided to the forward platform directional signal input 36b of the second motor flow control valves 32b by way of line 80, consequently providing pneumatic power to the reverse direction input 26b of the second motor 22b (forward rotational direction).

The reverse platform control sequence can output the pneumatic power from line 58 and upon activation provide a reverse motion pneumatic control signal, by way of lines 86, to the first motor reverse shuttle valve 70 and the second motor reverse shuttle valve 78.

The pneumatic control signal from the first motor reverse shuttle valve 70 is provided to the reverse signal input 38a of the first motor flow control valves 32a by way of line 72, consequently providing pneumatic power to the reverse direction input 26a of the first motor 22a (reverse rotational direction). Further, the pneumatic control signal from the second motor reverse shuttle valve 78 is provided to the reverse signal input 38b of the second motor flow control valves 32b by way of line 80, consequently providing pneumatic power to the forward direction input 24b of the second motor 22b (reverse rotational direction).

The joystick 115 can be a 5-way, three position (forward, reverse, neutral) valve that provides a forward pneumatic control signal 115a or a reverse pneumatic control signal 115b to motor 22a. The joystick 116 can be a 5-way, three-position (forward, reverse, neutral) valve that provides forward motion pneumatic control signal 116a or a reverse pneumatic control signal 115b to the 22b motor.

It can be appreciated that a two-motor robotic crawler platform 12' can include at least four motor shuttle valves 66, 70, 74, 78, equaling two shuttle valves per motor actuated by two joysticks, 115a/b and 116a/b. It can be further appreciated that the motor shuttle valves can act as an OR logic switch, which only provides one pneumatic signal 68, 72, 76, 80 to their respective flow control valves based on the position or operation of the user input assembly to forward, reverse, left turn or right turn.

As such, the air logic control system 60" can be configured to provide a forward or right pneumatic signal to the first motor forward signal input 36a by way of the first motor forward shuttle valve 66, and a reverse or left pneumatic signal to the first motor reverse signal input 38a by way of the first motor reverse shuttle valve 70.

A pneumatic signal can be provided to the second motor forward signal input 36b by way of the second motor forward shuttle valve 74, and a reverse or right pneumatic signal to the second motor reverse signal input 38b by way of the second motor reverse shuttle valve 78.

In use, it can now be understood that pneumatic power provided by the pneumatic source 50 can be supplied to the main pneumatic switch 54, which can then provide the pneumatic power to the air logic control system 60" and to the pneumatic motors 22a, 22b. It can be appreciated that the pneumatic motors 22a, 22b and the air logic control system 60" will not operate unless the main pneumatic switch 54 is operated in combination with a pneumatic signal being provided to any one of or any combination of the flow control valve 32a, 32b by the air logic control system 60". Alternatively, the pneumatic power from the pneumatic source 50 can be supplied to the main pneumatic switch 54 and to the air logic control system 60" independently, with the pneumatic main switch 54 controlling the pneumatic power to the pneumatic motors 22a-d.

Forward, right, reverse, and left motion of the robotic crawler platform 12' can be controlled by the operation of the pneumatic motors 22a, 22b, and more specifically by the providing of a pneumatic control signal to one of their respective motor forward direction inputs 24a, 24b or reverse direction input 26a, 26b. Table 4 provides a representation of some of the different motions of the robotic crawler platform 12' as compared with operation of its corresponding motor forward direction input 24a, 24b or reverse direction input 26a,26b. With this in mind, a forward motion of the second motor 22b can be provided by supplying pneumatic power to its corresponding reverse input 26b.

While the main pneumatic switch 54 is activated to allow pneumatic power to be provided to the flow control valves 32a, 32b, it can be appreciated that if a user provides a forward motion input to the user input assembly 62", for example by pressing joystick 115 to forward position 115a, then pneumatic signals are provided to the first motor forward shuttle valve 66 and pressing the 116 joystick to forward position 116a engaging shuttle valve 74. Accordingly, a pneumatic signal is then permitted to flow to the forward signal input 36a, 36b of the first and second motor flow control valves 32a, 32b that results in the first and second pneumatic motors 22a, 22b to move their corresponding wheel 20a, 20b in a forward direction. Consequently, resulting in the robotic crawler platform 12' to move forward.

While the main pneumatic switch 54 is activated to allow pneumatic power to be provided to the flow control valves 32a, 32b, it can be appreciated that if a user provides a forward motion input to the user input assembly 62". Accordingly, a pneumatic signal is then permitted to flow to the forward signal input 38a, 38b of the first and second motor flow control valves 32a, 32b that results in the first and second pneumatic motors 22a, 22b to move their corresponding wheel 20a, 20b in a reverse direction. Consequently, resulting in the robotic crawler platform 12' to move in forward.

While the main pneumatic switch 54 is activated to allow pneumatic power to be provided to the flow control valves

32a, 32b, it can be appreciated that if a user provides a reverse motion input to the user input assembly 62". Accordingly, a pneumatic signal is then permitted to flow to the reverse signal input 38a, 38b of the first and second motor flow control valves 32a, 32b that results in the first and second pneumatic motors 22a, 22b to move their corresponding wheel 20a, 20b in a reverse direction. Consequently, resulting in the robotic crawler platform 12' to move in reverse.

While the main pneumatic switch 54 is activated to allow pneumatic power to be provided to the flow control valves 32a, 32b, it can be appreciated that if a user provides a reverse motion input to the user input assembly 62". Accordingly, a pneumatic signal is then permitted to flow to the reverse signal input 38a, 38b of the first and second motor flow control valves 32a, 32b that results in the first and second pneumatic motors 22a, 22b to move their corresponding wheel 20a, 20b in a reverse direction. Consequently, resulting in the robotic crawler platform 12' to move in reverse.

While the main pneumatic switch 54 is activated, it can be appreciated that if a user provides a right motion input to the user input assembly 62". Accordingly, a pneumatic signal is then permitted to flow to the forward signal input 36a of the first motor flow control valve 32a that results in the first pneumatic motor 22a to move its corresponding wheel 20a in a forward direction. Further, a pneumatic signal is also permitted to flow to the reverse signal input 36b of the second motor flow control valve 32b that results in the second pneumatic motor 22b to move its corresponding wheel 20b in a reverse direction. Consequently, resulting in the robotic crawler platform 12' to move to the right.

While the main pneumatic switch 54 is activated, it can be appreciated that if a user provides a left motion input to the user input assembly 62", for example by moving the 115b joystick reverse, then pneumatic signals are provided to the first motor reverse shuttle valve 70 and the second motor forward shuttle valve 74. Accordingly, a pneumatic signal is then permitted to flow to the reverse signal input 38a of the first motor flow control valve 32a that results in the first pneumatic motor 22a to move its corresponding wheel 20a in a reverse direction. Further, a pneumatic signal is also permitted to flow to the forward signal input 36b of the second motor flow control valve 32b that results in the second pneumatic motor 22b to move its corresponding wheel 20b in a forward direction. Consequently, resulting in the robotic crawler platform 12' to move to the left.

Additionally, the pneumatic motors 22a and 22b can be operated to provide a left and right turning motion, as shown in Table 5. This turning motion can be implemented by operating only one of the first or second pneumatic motors 22a, 22b or both for sharper turns.

It can be appreciated that any one of or any combination of the first and second motors 22a, 22b along with any combination of rotational direction of the first and second motors 22a, 22b can be utilized to provide any degree of turning with or without a forward or reverse motion component.

In some embodiments, a first form of speed/regulating control is provided by Individual flow control valves noted as 44a and 44b onboard platform 12' (see FIG. 7). It would be understood that in some embodiments, this first form of speed control may be adopted in the system of FIG. 8 (although not shown in FIG. 8). Second and third forms of regulating controls are illustrated in the embodiment of FIG. 8. The second form of regulating controls is an R1 flow regulator that is arranged on 60" to provide flow control to 12' as incoming flow regulation by flow to the motors specified direction in direct communication with the incoming pneumatic current to the respective motors. Additionally, or alternatively, a third form of regulating control observed in FIG. 8 are the incoming ported flow controls that can be in control box 60" controlling directional exhaust restrictions independently to each direction (forward/reverse) of each motor 22a/22b, thus providing more precision in speed control than the first and second forms of speed/regulating control. As illustrated in FIG. 8, the incoming ported flow controls are control valves 44c, 44d, 44e, 44f in fluid communication with respective exhaust outputs 151, 152, 153, 154 of the exhaust ports of control valves 32a,32b such that directional exhaust restrictions are being controlled independently to each direction (forward/reverse) of each motor. It would be understood that in some embodiments such flow control values 44a, 44b 44c, 44d, 44e, 44f can be for example but not limited to one-way flow control valves, potentiometers, and the like. In some embodiments, the exhaust ports that provide exhaust outputs 151, 152, 153, 154 air pneumatic mufflers.

Any one or combination of the aforementioned first, second and third flow controls and methods may be adopted in FIG. 8 or any one of the other embodiments, where appropriate.

With reference to the above-described four motor and two motor configurations, it can be appreciated that any combination of the above describe two-lever joysticks 115a/b, 116a/b can be operated independently or simultaneously, thereby providing varying degrees of controlled operation of any one of or any combination of the pneumatic motors 22a-d.

The user input assembly 62" can be, but not limited to, two or more three-way joystick levers capable of controlling the pneumatic control signals to the multi-direction flow control valves 32a for left motor 20a and 32b for right motor 20b.

The pneumatic power from the pneumatic source 50 is further provided to the user input assembly 62" and to the left motor joystick 115b and right motor joystick 116b by way of line 58. It can thus be appreciated that the pneumatic power from the pneumatic source 50 is provided as the pneumatic power that operates the pneumatic motors 22a, 22b as well as to the air logic control system 60".

The air logic control system 60" can include a dual-lever user input assembly versus previously shown button interface 62" allowing a user to control the movement and/or operation of the robotic crawler platform 12' in previously disclosed motion (forward, reverse, left, right). The motions can be sequenced with the use of left lever 115 and right lever 116. Each has a forward position for left joystick/lever of 115a and right as 116a and reverse position as 115b for left motor and 116b for the right joystick/lever. Both 115 and 116 have center neutral position as default resting position.

In the exemplary, the user input assembly 62" of the air logic control system 60" left motor 22a will be described as 115a for forward and 115b for reverse is a two-lever control system including a left motor control forward 66 and a reverse 70.

In the exemplary, the user input assembly 62" of the air logic control system 60" right motor 22b will be described as 116a for forward and 116b a two-lever control system including a right motor control forward 74 and a reverse 78.

It can be appreciated that the user input assembly 62" can provide the pneumatic control signal to the appropriate motor shuttle valves 66, 70, 74, 78 to provide the desired motion of the robotic crawler platform 12'.

In the exemplary, the user input assembly 62" of the air logic control system 60" will be described as a two-lever control system including a left motor control lever/joystick 115a with a forward joystick signal 66 providing a forward motor motion signal to 26a on motor 2a delivering a forward platform 12' motion and a right motor control lever/joystick 116a with a forward joystick signal 74 providing reverse motor motion signal to 26b on motor 2b delivering forward platform 12' motion In the exemplary, the user input assembly 62" of the air logic control system 60" will be described as a two-lever control system including a left motor control lever/joystick 115b with a reverse joystick signal 70 providing a reverse motor motion signal to 24a on motor 2a delivering a reverse platform 12' motion and a right motor control lever/joystick 116a with a reverse joystick signal 78 providing forward motor motion signal to 26b on motor 2b delivering revers platform 12' motion Whereas the forward position of 115a joystick for providing forward motion of motor 2a in the sequence of 66>68>36a>40a>24a logic control flow for wheel in motion to deliver platform forward motion potential and in additional forward position of 116a joystick provides reverse motor sequencing of motor 2b in the 78>80>36b>40b>26b delivering platform forward motion potential. This combination delivers forward motion of platform '12.

Whereas the back/reverse position of 115b joystick provides reverse motion sequencing of motor 2a in the 70>72>38a>42a>26a logic control flow of the wheel in motion and back/reverse position of 116b joystick provides forward motor sequencing of motor 2b in the 74>76>38b>42b>24b delivering platform reversing motion potential for crawler platform 12'. This combination delivers reverse motion of platform '12.

Left turning platform control can be obtained by reverse directional control from left front motor with subsequent forward platform motion rotation from the right front motor. This sequence can be obtained by back position joystick sequencing of lever control for motor 22a and forward position joystick sequencing of lever 2 for motor 22b.

Subsequently right turning platform control can be obtained by forward directional control 115a to left front motor with subsequent reverse of 116b that will set platform motion rotation to the right.

Figure 9:
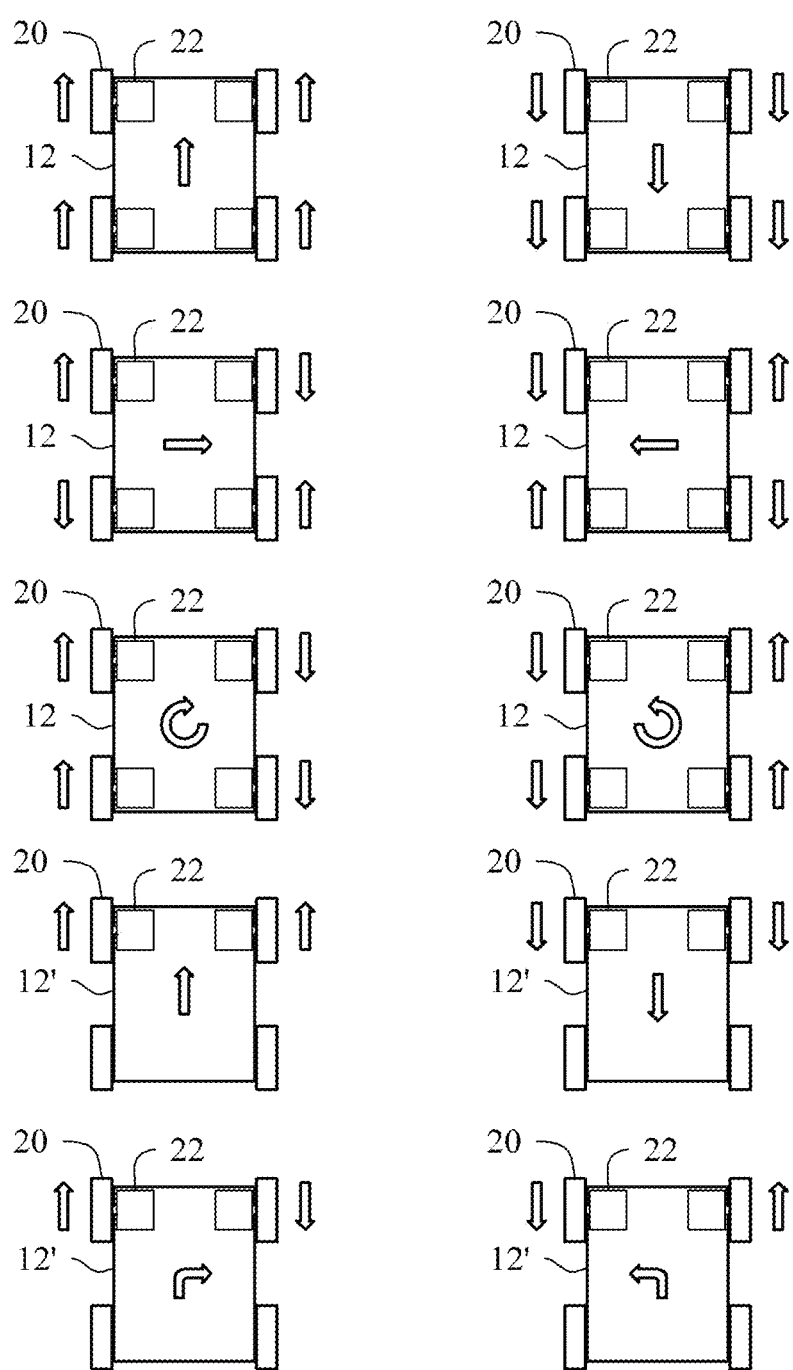
FIG. 9 is a block diagram showing possible directional motion of the robotic crawler platform and the rotational direction of the wheels as driven by their corresponding motor using air logic control systems of some of the embodiments.

FIG. 9 is an exemplary block diagram showing possible directional motion of the robotic crawler platform 12, 12', and the rotational direction of the wheels as driven by their corresponding motor controllable by the air logic. It can be appreciated that other possible motor controls and/or wheel rotation directions can be implemented by one or more embodiments of the present technology that what is shown or described. For example, one or more of the motors can be provided with pneumatic power greater than other motors. Still further in the exemplary, one or more motors can be provided with no pneumatic power while one or more other motors can be provided with pneumatic power of the same or varying degree.

It will be understood that in some embodiments, the combination or order of components and/or method steps may be changed, where appropriate. It will be further understood that in some embodiments, components and/or method steps from one embodiment may be used in place of or in addition to components and/or method steps of another embodiment, where appropriate. It will be yet further understood that one or more components and/or method steps may be omitted, where appropriate.

According to yet some other embodiments of the present technology, there is provided an automated pneumatic remote controlled robotic crawler or nondestructive testing of hazardous environments. This novel automated static mitigating pneumatic remote controlled robotic crawler for non-destructive testing of hazardous environments according to some other embodiments will now be described in more detail below and with reference to FIGS. 10 to 41.

In some embodiments, the automated non-electric and static-mitigating environments is a compressed air robotic crawler platform for nondestructive testing with multidirectional flow control flows through hoses to independent pneumatic motors attached to four independent omnidirectional wheels.

In some embodiments, the automated non-electric and static-mitigating environments is a compressed air robotic crawler platform for nondestructive testing with multidirectional flow control flows through hoses to independent pneumatic motors attached to four independent omnidirectional wheels.

In some embodiments, the automated low to no-static pneumatic remote controlled robotic crawler comprises multi-directional flow control valves for flow through hoses to independent pneumatic motors attached to four independent omnidirectional wheels interchangeable with direct drive wheels when increased traction is required. As stated above, confined space entry and hazardous carbon fumes present costly and dangerous risks for industry and inspectors. Static discharge concerns need mitigation while presenting access to difficult to access locations. Embodiments of the automated low to nostatic pneumatic remote controlled robotic crawler for non-destructive testing of hazardous environments described in this specification with reference to FIGS. 10 to 41 solve such problems by a pneumatic remote controlled solution for inspection by low to no-static robots. Pneumatic remote-controlled solutions may elevate utility and present a way to the necessary inspection in a safe and automated way through low to no-static robots. A digital sensor conventionally held by an inspector is put on an automated low-static robotic crawler with a platform could save time, money and increase safety/reliability of assets. The sensors will carry their own certifications.

Embodiments of the automated low-static pneumatic remote controlled robotic crawler for non-destructive testing of hazardous environments described in this specification with reference to FIGS. 10 to 41 differ from and improve upon currently existing options. In particular, some embodiments differ from the current inspection process, which is done with humans in confined spaces. This is dangerous for the asset and the human (fumes, etc.). Also, electric motors and static discharging materials are of great concern. The system in design introduces movement without discharge potential by way of pneumatic motors. Specifically, the use of high torque, low revolutions per minute (RPM) pneumatic motors are not prevalent in the inspection crawling robot platforms. The automated low-static pneumatic remote controlled robotic crawler seeks to have phase one prototype development with collaborative second generation design in concert with certifying body like UL to be the first Class I, Division I inspection platform or ATEX.

Currently, certifications are required for non-electric; therefore, this system will be delivering a higher degree of safety.

In addition, some embodiments of the automated low-static pneumatic remote controlled robotic crawler for non-destructive testing of hazardous environments improve upon the currently existing options by eliminating the use of electric motors which, in and around static discharging materials, are of great concern. Specifically, static discharge in electric motors is a highly dangerous possibility with the existing options. Add these concerns to the existing human safety concerns (fumes, etc.) and there is little doubt that the existing inspection process done with humans in small spaces is too dangerous for both human and assets being inspected, due to the potential electric discharge by electronic motor movements. The automated low-static pneumatic remote controlled robotic crawler of some embodiments of the present disclosure introduces movement without discharge potential. Furthermore, the automated low-static pneumatic remote controlled robotic crawler can potentially be utilized for more frequent and varied deployments as some of the extra cleaning processes save time/money. In some embodiments, the automated low-static pneumatic remote controlled robotic crawler brings the human back in a data review mode versus direct access. This is accomplished by multi-directional flow control flows through hoses to independent pneumatic motors attached to four independent omnidirectional wheels of the automated pneumatic remote controlled robotic crawler. Also, the automated low-static pneumatic remote controlled robotic crawler can incorporate sensors and other devices or circuits which produce additional aspects as a part of a whole integrated system.

The automated low-static pneumatic remote controlled robotic crawler for non-destructive testing of hazardous environments of some embodiments of the present disclosure may be comprised of the following elements. This list of possible constituent elements is intended to be exemplary only and it is not intended that this list be used to limit the automated low-static pneumatic remote controlled robotic crawler to just these elements. Persons having ordinary skill in the art relevant to the present disclosure may understand there to be equivalent elements that may be substituted within the present disclosure without changing the essential function or operation of the automated low-static pneumatic remote controlled robotic crawler.

1. Crawler 1000
2. Top plate 1001
3. Axle bushing 1002
4. Base block for controls 1018
5. Four independent omnidirectional Mecanum wheels 1004
6. Four independent pneumatic motors 1005
7. Frame 1006
8. Valves 1017, hoses 1009

As will be explained in more detail below, the various elements of the automated low-static pneumatic remote controlled robotic crawler for non-destructive testing of hazardous environments of the present disclosure as presented in the FIGS. 10 to 41 may be related according to assembly and sub-assemblies shown in the accompanying drawings 10 to 41. In this way, the components and elements of the automated low static pneumatic remote controlled robotic crawler for non-destructive testing of hazardous environments are integrated into a single compact system.

Crawler

Platform and Chassis

Figures 10, 11:
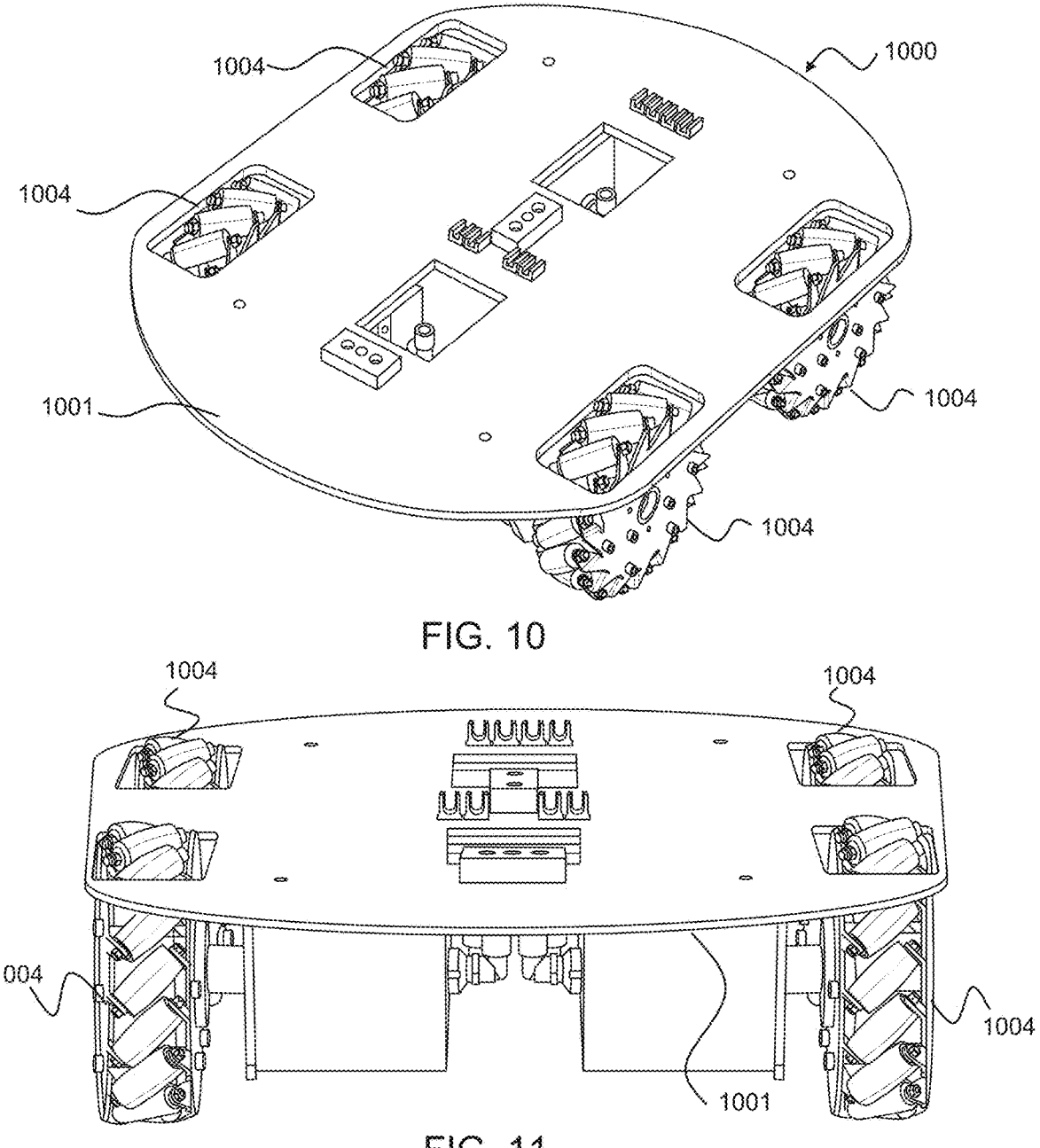
FIG. 10 is a top perspective view of a crawler according to some embodiments for a pneumatic crawling robot according to another aspect of the present technology.
FIG. 11 is front perspective view of the crawler of FIG. 10.

FIG. 10 is atop perspective view of a crawler 1000 according to some embodiments for a pneumatic crawling robot according to another aspect of the present technology. FIG. 11 is front perspective view of the crawler 1000 of FIG. 10. Components according to some embodiments for the crawler 1000 of FIG. 11 are as follows: GLOBE RM004 motor, Axle bushings, Frame, Bumper plate, Mecanum wheels, Wheel hubs, L connectors (G⅛-8 mm), Tube holder, and Fasteners. Note the following points: 1) Thickness around 4 mm (whatever is easily available to you), 2) Check stiffness, depending on material, 3) Can be made from flat plate and bended or multiple flat pieces connected in another way, 4) Depends on supplier experience, and 5) availability 2D drawing and STEP-file available.

Deck and Baseplate

Figure 12:
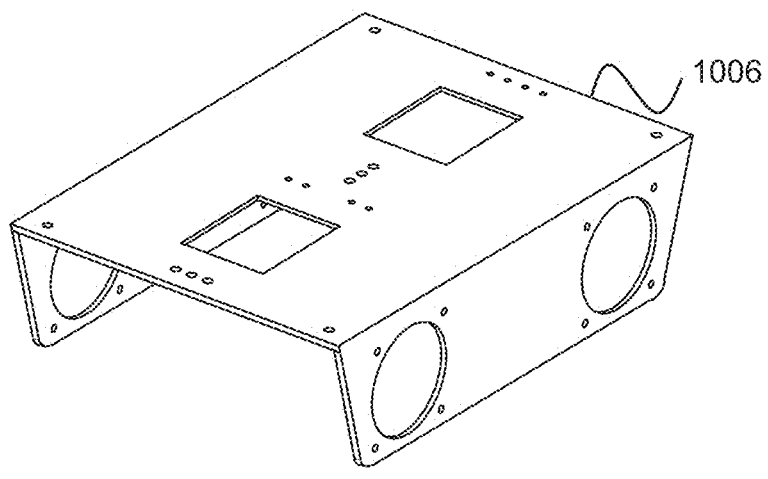
FIG. 12 is the base plate according to some embodiments for the crawler of FIG. 11.

FIG. 12 is the base plate 1006 according to some embodiments for the crawler of FIG. 11.

Top Plate

Figure 13:
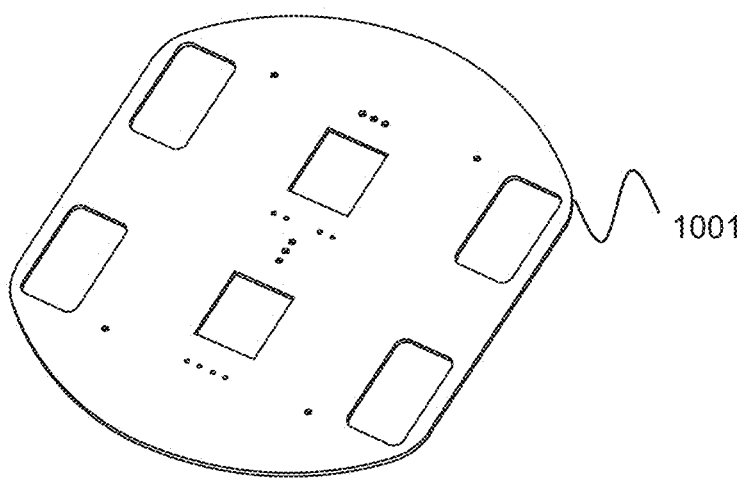
FIG. 13 is the top plate according to some embodiments for the crawler of FIG. 11.

FIG. 13 is the top plate 1001 according to some embodiments for the crawler 1000 of FIG. 11. Note the following points: 1) Original thickness is 4 mm, but can be whatever is available and reasonably stiff, 2) Laser cut, waterjet cut or mill from flat sheet of polymer, 3) Check what works well with the material and what the supplier/manufacturer recommends, [I]ideally manufactured at the same company as the frame so that similar tolerances are used, and 4) 2D drawing and STEP-file available.

Axel Bushing

Figure 14:
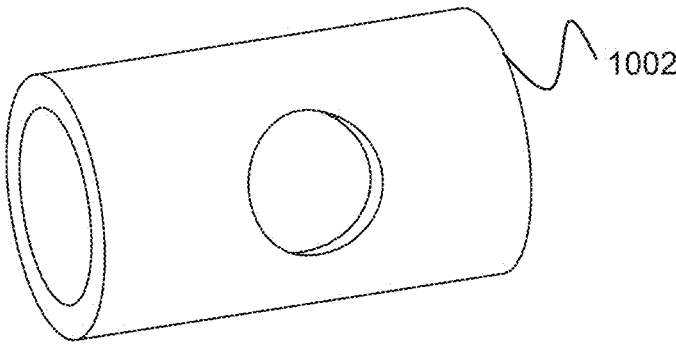
FIG. 14 is the axle bushing according to some embodiments for the crawler of FIG. 11.

FIG. 14 is the axle bushing 1002 according to some embodiments for the crawler 1000 of FIG. 11. Note the following points: 1) This is an ordered part, but it needs an extra hole to accommodate the fitting bolt, 2) If it is difficult to locate the hole exactly in the middle the diameter can be increased to 7 mm to increase the clearance, and 3) 2D drawing available.

Figure 32:
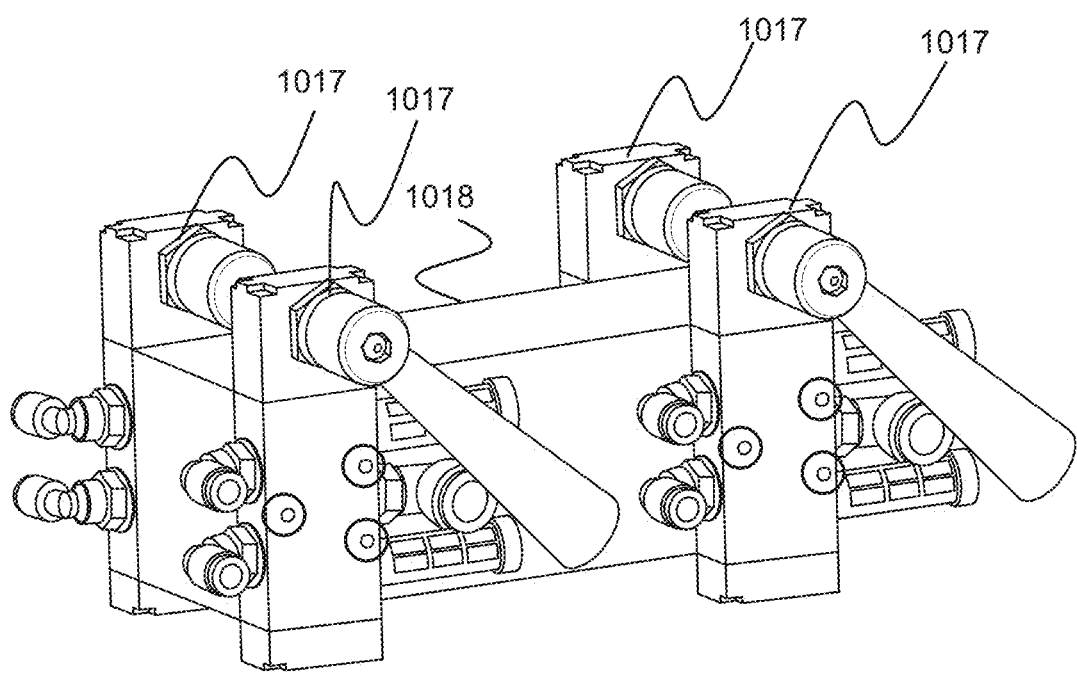
FIG. 32 illustrates the valves of FIG. 31 assembled to a base block for controls according to some embodiments for controlling the crawler of FIG. 11.

Base Block for Controls (See FIG. 32)

The base block 1018 can just be a block of wood. The dimensions are not critical, see what you can easily find. Important are: 1) The hole pattern so that the valves can be mounted (making the holes oversized makes it easier, 2) The distance between the valves should be big enough so that there is no interference, and 3) 2D drawing and STEP-file available.

Crawler Assembly

Mecanum Wheel Sub-Assembly

Figure 15:
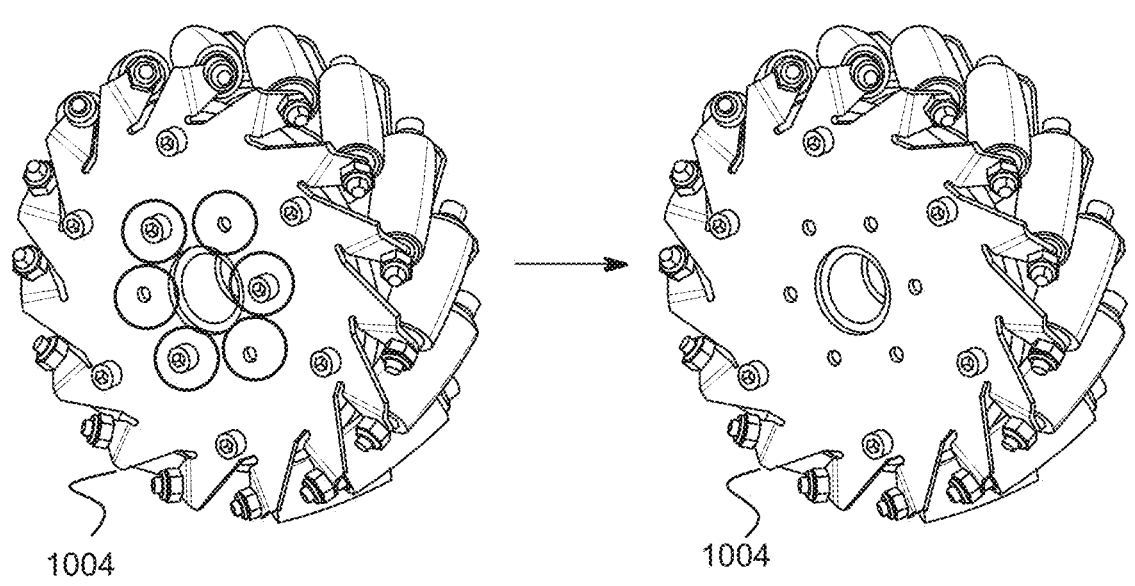
FIG. 15 are views of mecanum wheel sub-assembly according to some embodiments for the crawler of FIG. 11.
Figure 16:
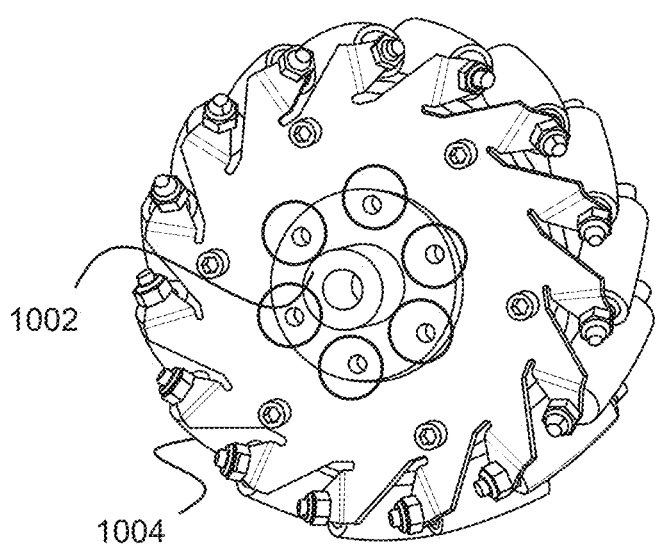
FIG. 16 is a view of the mecanum wheel sub-assembly of FIG. 15 with the axle bushing.
Figure 17:
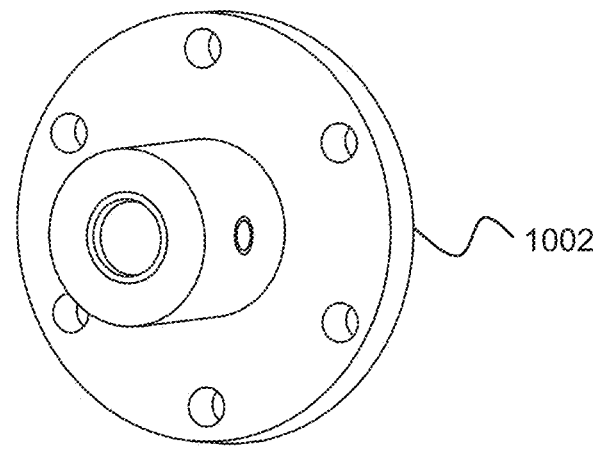
FIG. 17 is a partial view of the mecanum wheel sub-assembly of FIG. 16 and illustrating the axle bushing.

FIG. 15 are views of mecanum wheel sub-assembly 1004 according to some embodiments for the crawler 1000 of FIG. 11. Note the following: 1. If the wheel is not assembled, assemble it according to manufacturer's instructions, 2. Remove center bolts carefully 1. Already put a few M5×60 mm bolts (for the next step) in the empty holes to keep them aligned. FIG. 16 is a view of the mecanum wheel sub-assembly 1004 of FIG. 15 with the axle bushing 1002. 1. Mount the wheel hub with the six M5×60 mm bolts 1. The threaded part (where the nut goes) is on the hub side (to avoid the bolts sticking out) 2. Place a washer over the bolt and tighten with the lock nut. FIG. 17 is a partial view of the mecanum wheel sub-assembly 1004 of FIG. 16 and illustrating the axle bushing 1002. 1. Slide the axle bushing into the hub and align the holes on the side.

> 2. Thread in the mounting bolt (delivered with the hub) to keep the holes aligned during assembly 1. Only thread it in to keep the bushing aligned, if it sticks out it will prevent mounting on the axle.

Motor Sub-Assembly

Figure 18:
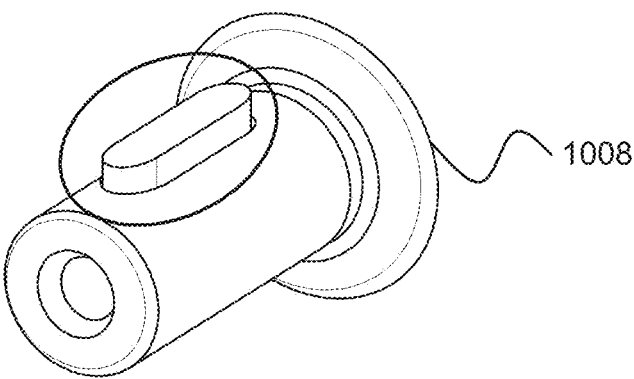
FIG. 18 is a view of the shaft of the motor sub-assembly according to some embodiments for the crawler of FIG. 11.
Figure 19:
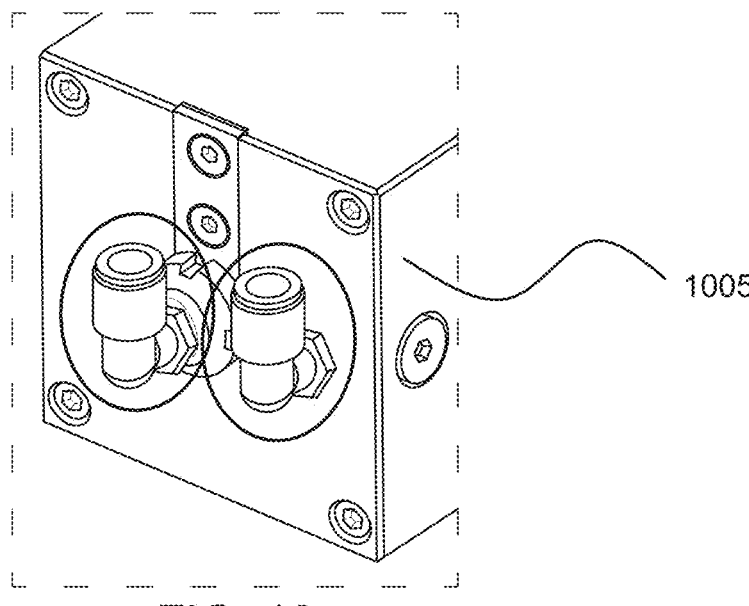
FIG. 19 is the back side of the motor sub-assembly according to some embodiments for the crawler of FIG. 11.

FIG. 18 is a view of the shaft 1008 of the motor sub-assembly 1005 according to some embodiments for the crawler 1000 of FIG. 11. FIG. 19 is the back side of the motor sub-assembly 1005 according to some embodiments for the crawler 1000.

> 1. Remove the key from the shaft (if already mounted) 2. On the back side, mount two L-connectors (NPQM-L-G18-Q8-P10).

Frame Assembly

Motor Mount Assembly

Figure 20:
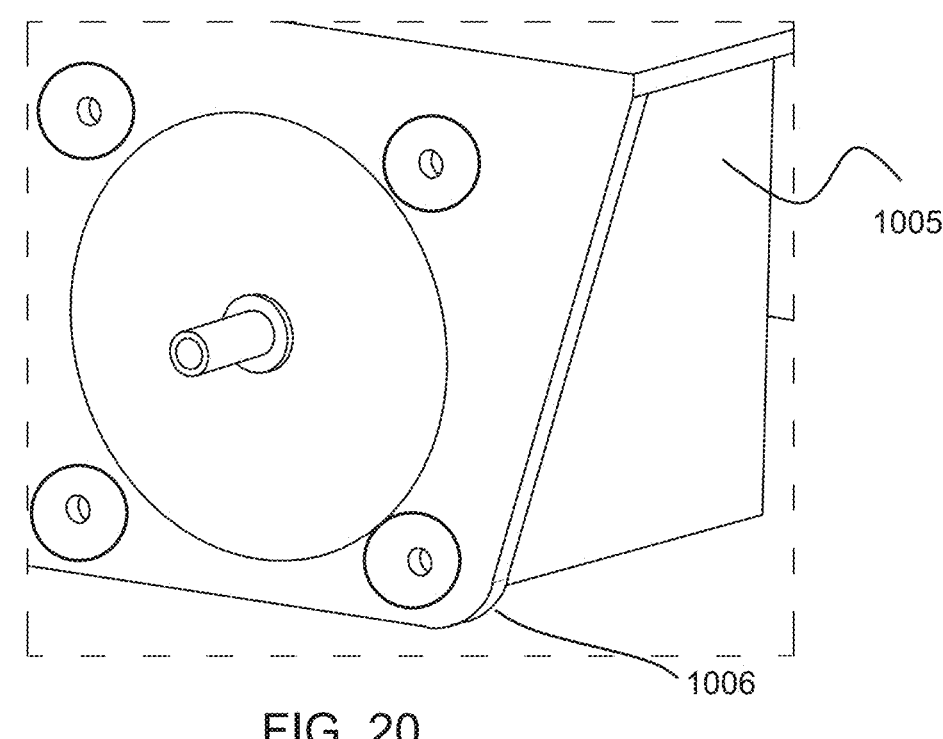
FIG. 20 is a partial view illustrating the motor sub-assembly of FIG. 19 mounted to the frame for the crawler of FIG. 11.
Figure 21:
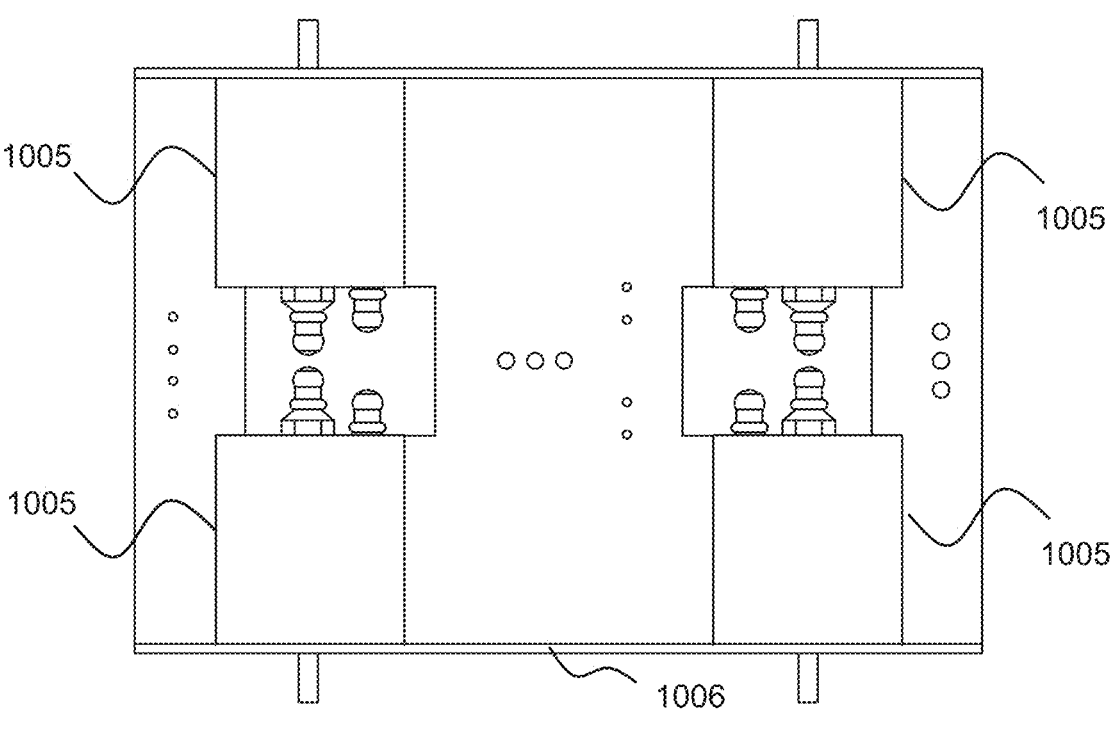
FIG. 21 is a view illustrating 4 motor sub-assemblies according to some embodiments mounted to the frame for the crawler of FIG. 11.

FIG. 20 is a partial view illustrating the motor sub-assembly 1005 of FIG. 19 mounted to the frame 1006 for the crawler 1000 of FIG. 11. FIG. 21 is a view illustrating 4 motor sub-assemblies 1005 according to some embodiments mounted to the frame 1006 for the crawler 1000 of FIG. 11. 1. Mount the 4 motor sub-assemblies 1005 to the frame 1006 with the M5×15 mm bolts and M5 washers 1. Mount the motors such that the connectors are aligned as in the FIGS. 20 and 21.

Figures 22, 23:
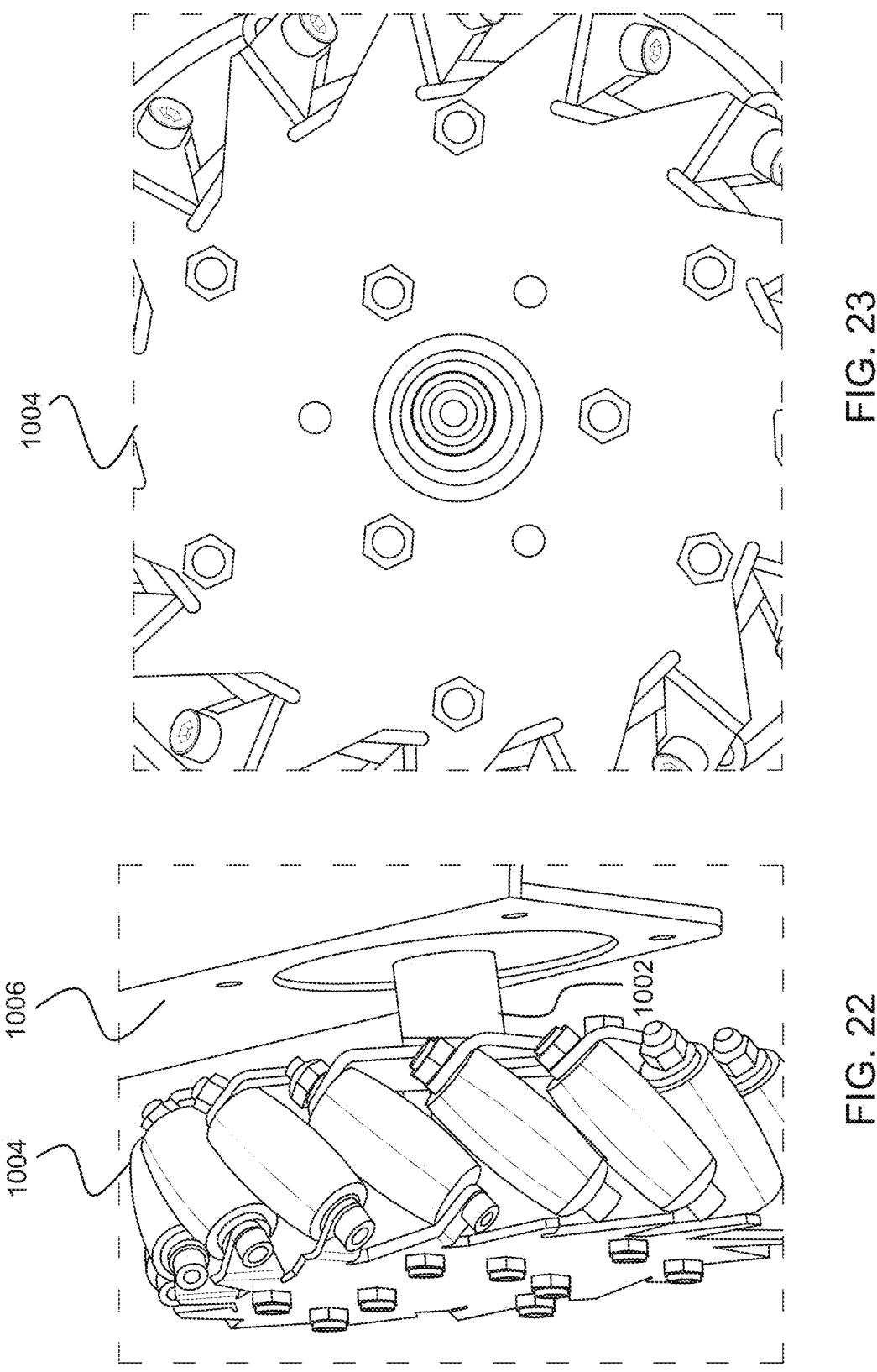
FIGS. 22 to 24 illustrate different partial views of the mounted Mecanum wheel sub-assemblies for the crawler of FIG. 11.
Figures 24, 25:
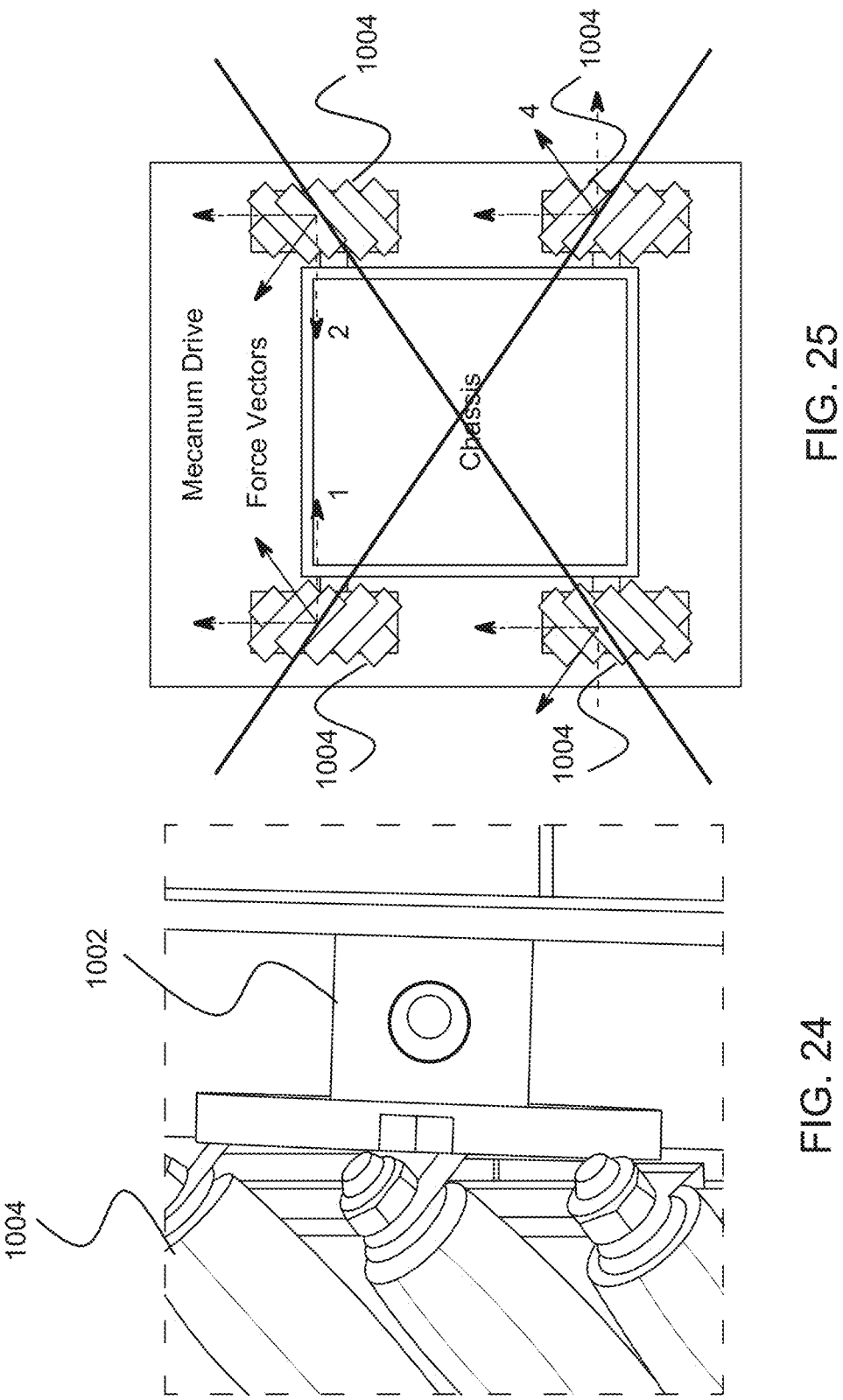
FIG. 25 illustrates a view from the top of the mecanum drive showing the wheels of the mounted Mecanum wheel sub-assemblies for the crawler of FIG. 11.

FIGS. 22 to 24 illustrate different partial views of the mounted Mecanum wheel sub-assemblies 1004 for the crawler 1000 of FIG. 11. 1. Slide the Mecanum wheel sub-assembly onto the motor shaft 1008 2. Thread and tighten the M4×15 mm bolt (with special washer (FWSSM-D17-V4.5-T3)) into the threaded hole in the shaft 3. Tighten the securing bolt on the side of the hub.

FIG. 25 illustrates a view from the top of the mecanum drive showing the wheels of the mounted Mecanum wheel sub-assemblies for the crawler of FIG. 11. 1. Mount all four Mecanum wheel sub-assemblies such that the wheels make an X-shape when looking from the top.

Figure 26:
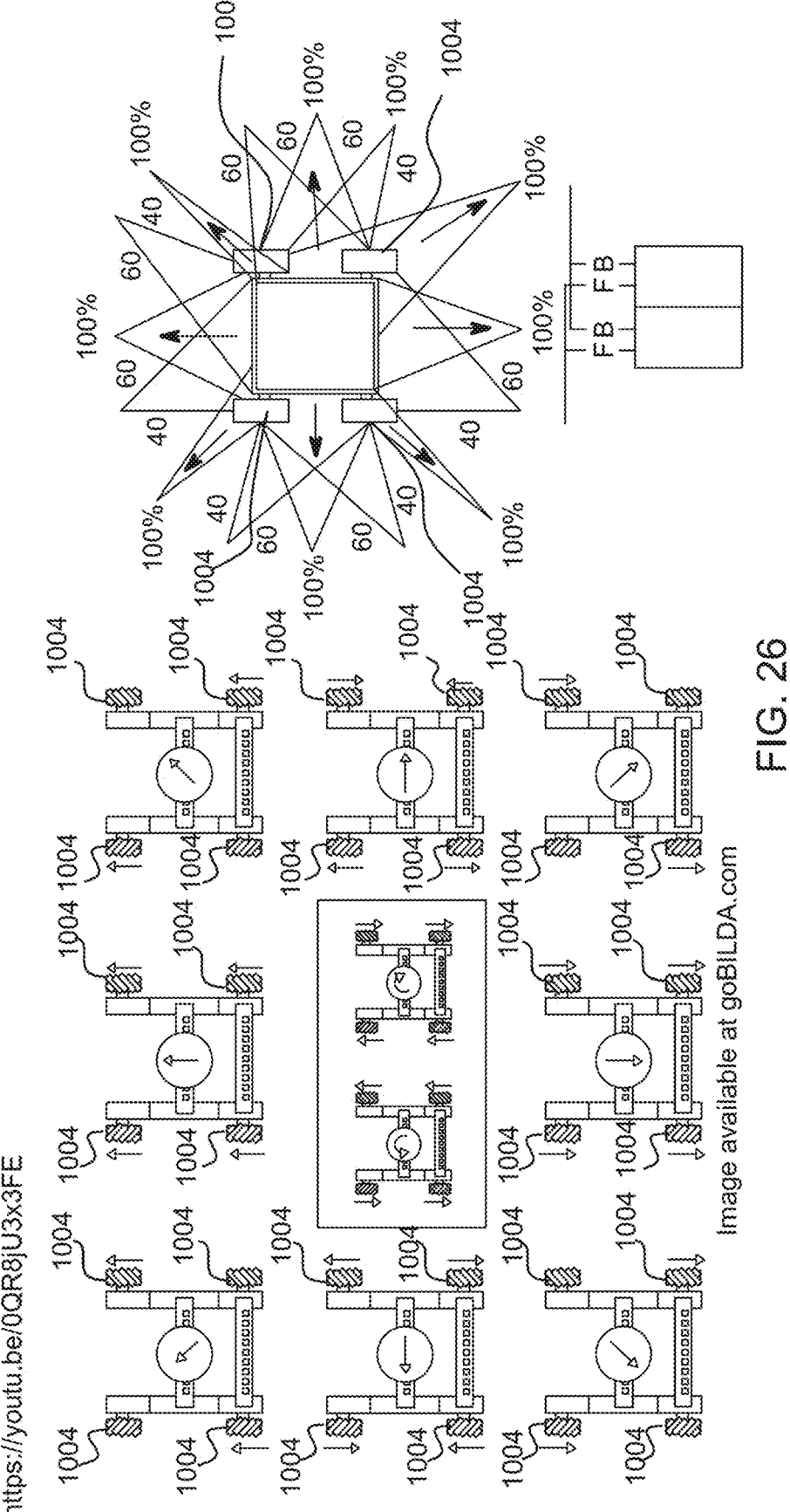
FIG. 26 illustrates possible configurations of the mecanum drive of FIG. 25.

FIG. 26 illustrates possible configurations of the mecanum drive of FIG. 25;

Hose Management Mounts

Figure 27:
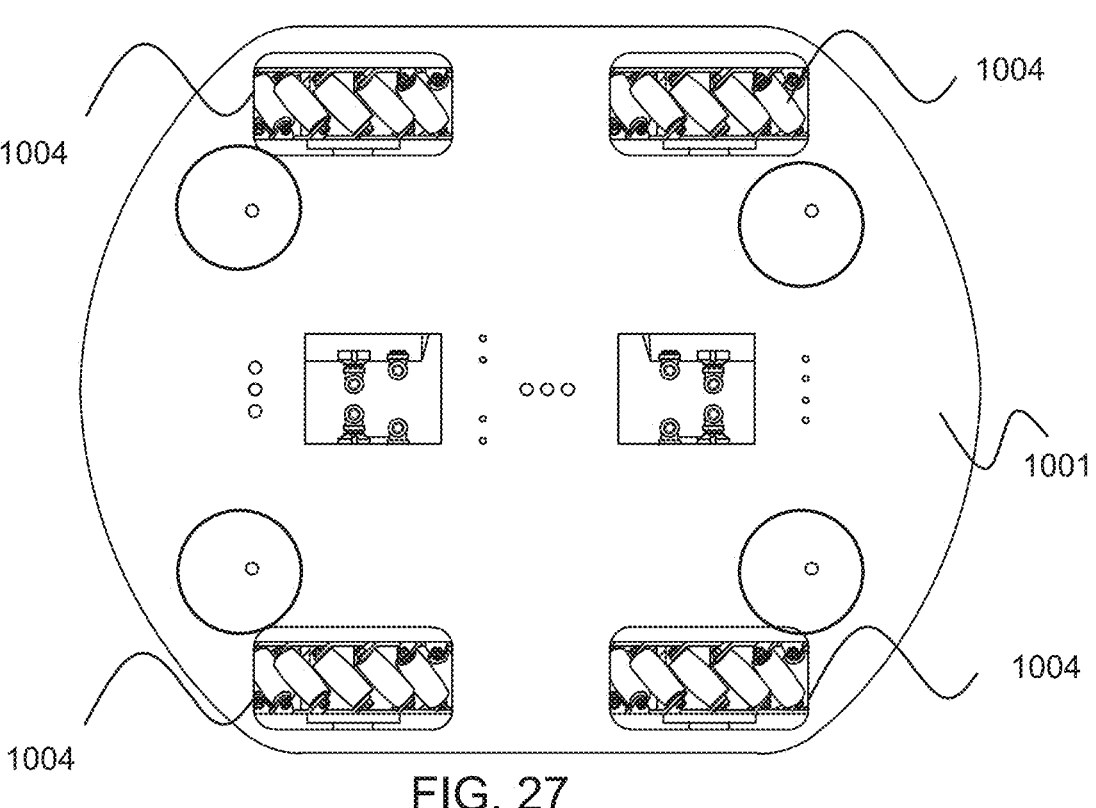
FIG. 27 illustrates the top plate of FIG. 13 mounted to the mecanum drive of FIG. 25 for hose management.
Figure 28:
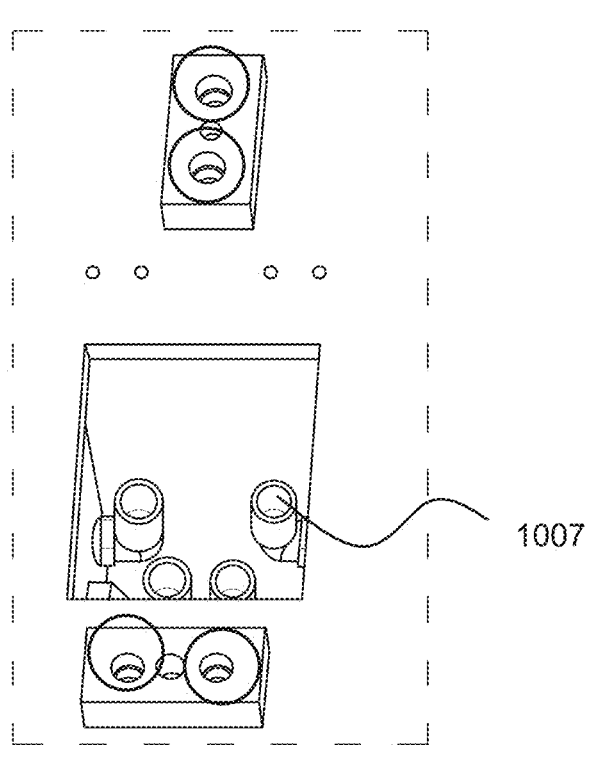
FIG. 28 is a partial view illustrating tube holders according to some embodiments mounted to the assembly of FIG. 27 for hose management.
Figure 29:
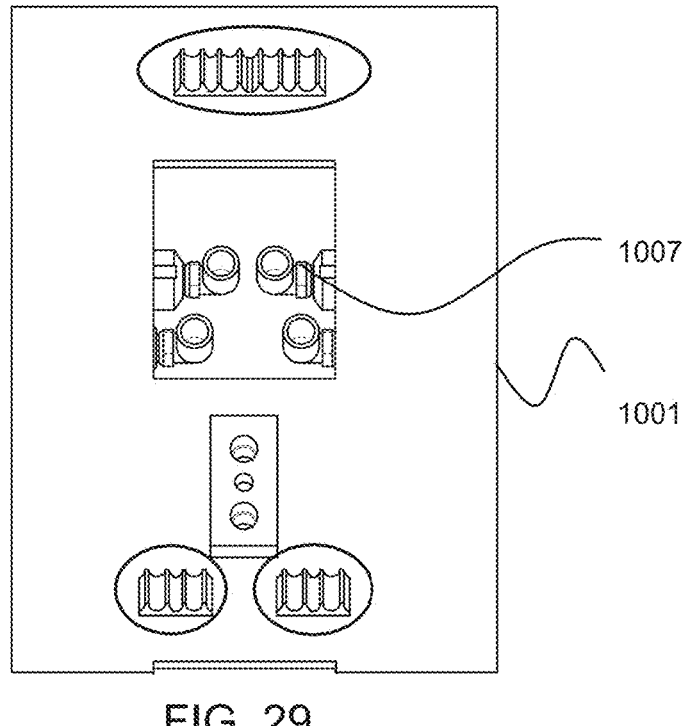
FIG. 29 is a partial view illustrating accessory plates according to some embodiments mounted to the assembly of FIG. 27 for hose management.

FIG. 27 illustrates the top plate of FIG. 13 mounted to the mecanum drive of FIG. 25 for hose management. FIG. 28 is a partial view illustrating tube holders 1007 according to some embodiments mounted to the assembly of FIG. 26 for hose management. FIG. 29 is a partial view illustrating accessory plates according to some embodiments mounted to the assembly of FIG. 26 for hose management. 1. Mount the top plate with the 4¼" bolts, washers on both sides and lock nuts. (do not tighten yet) 2. Mount the accessory base plates with the ¼" bolts and a washer and lock nut (do not tighten yet) 3. Mount the tube holders with the M3×25 mm (countersunk) bolts and a washer and lock nut 4. Tighten all bolts and nuts.

Figure 30:
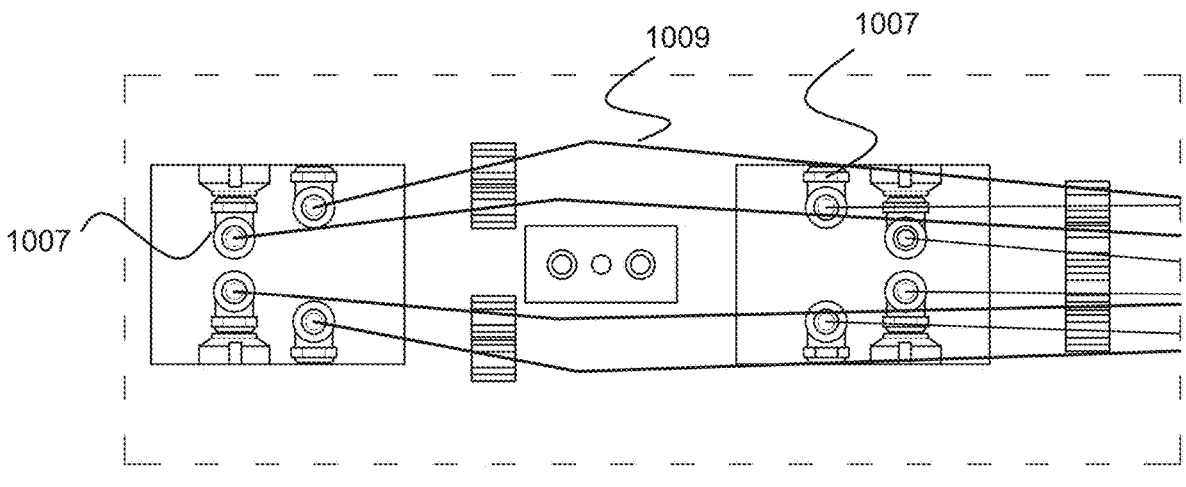
FIG. 30 illustrates the routing according to some embodiments for tubes pushed into the tube holders of FIG. 28.

FIG. 30 illustrates the routing according to some embodiments for tubes pushed into the tube holders 1007 of FIG. 29. 1. Press the 8 mm tubes into the connector 2. Push the tubes in the holders according to the routing below 1. Make sure to give the tubes a smooth radius.

Control Assembly

Components of a control assembly according to some embodiments for controlling the crawler of FIG. 11 are as follows: manually controlled valve, L connector (G¼-12 mm), L connector (G¼-8 mm), Silencer (G/14), Camera thread (¼-20) base plate, M4 SHCS-120 mm length. M4 lock nuts, and M4 washers.

Valve Sub-Assembly

Figure 31:
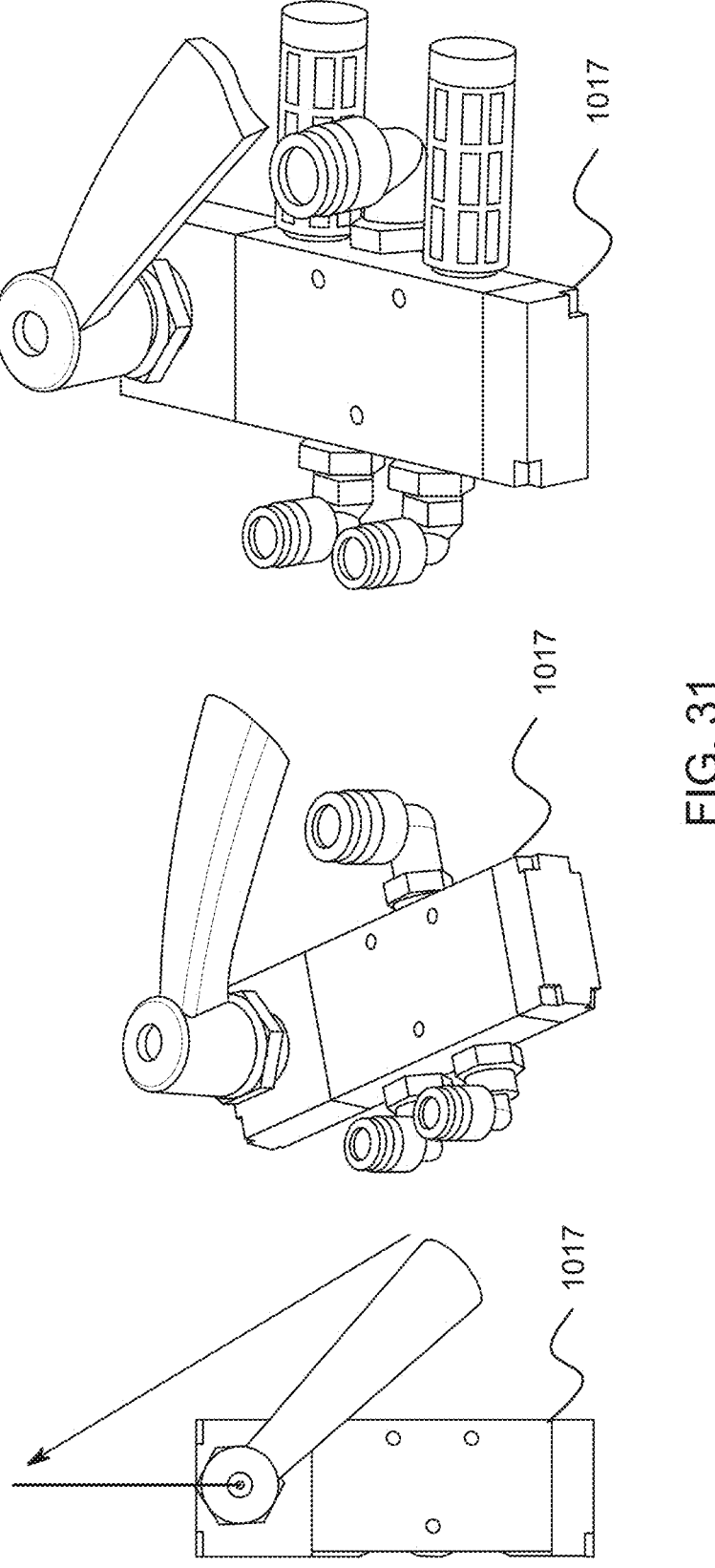
FIG. 31 illustrates valves according to some embodiments for the control assembly for controlling the crawler of FIG. 11.

FIG. 31 illustrates valves 1017 according to some embodiments for the control assembly for controlling the crawler of FIG. 11. 1. Adjust the lever so that it is vertical in the middle (neutral) position 2. Thread the two 8 mm connectors (QSL-G¼-8) into the outlet ports and the 12 mm connector (QSL-G¼-12) into the inlet 3. Connect the silencers (U-¼) to the last two ports.

FIG. 32 illustrates the valves 1017 of FIG. 31 assembled to the base block 1018 according to some embodiments for controlling the crawler of FIG. 11. 1. Bolt the valves to the base block using the M4×120 mm bolts and washers and lock nuts.

Figure 33:
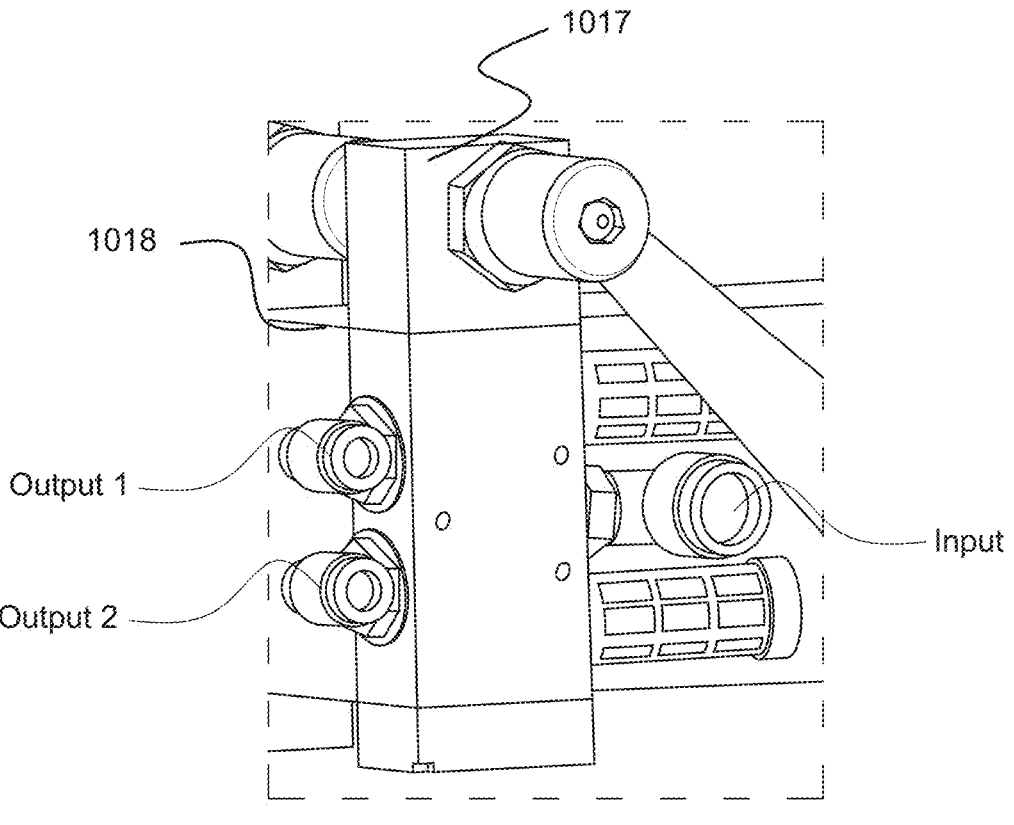
FIG. 33 illustrates a partial view of the assembly of FIG. 32.
Figure 34:
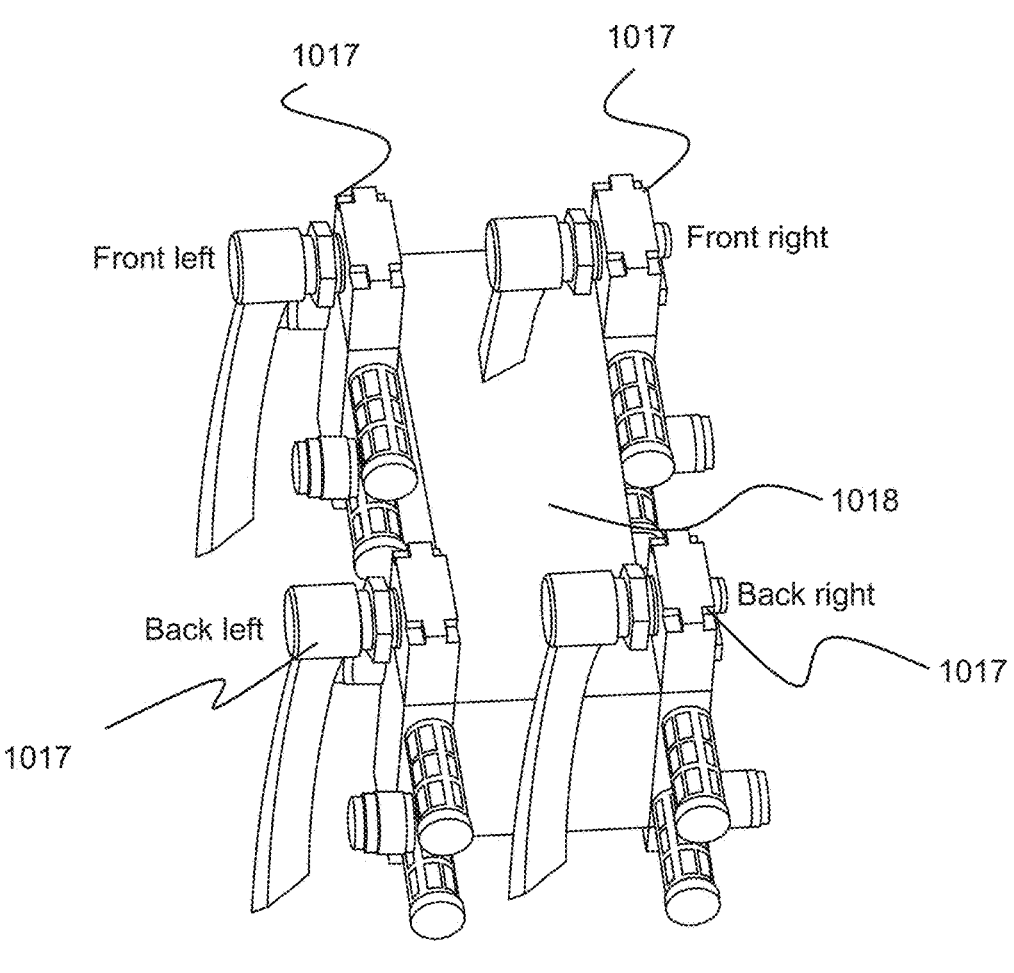
FIG. 34 illustrates another view of the assembly of FIG. 32.

FIG. 33 illustrates a partial view of the assembly of FIG. 32. FIG. 34 illustrates another view of the assembly of FIG. 32. 1. Each valve 1017 corresponds to a wheel (see picture)

2. Connect a 12 mm tube to the 4-way splitter, (which is connected to compressed air) 3. Connect the 12 mm tube to the input of the valve 4. Connect two 8 mm tubes from one motor to the outputs of the valve 5. Test if moving the handle forward spins the wheel forward 1. If it is spinning backwards, swap the two 8 mm tubes.

Figure 35:
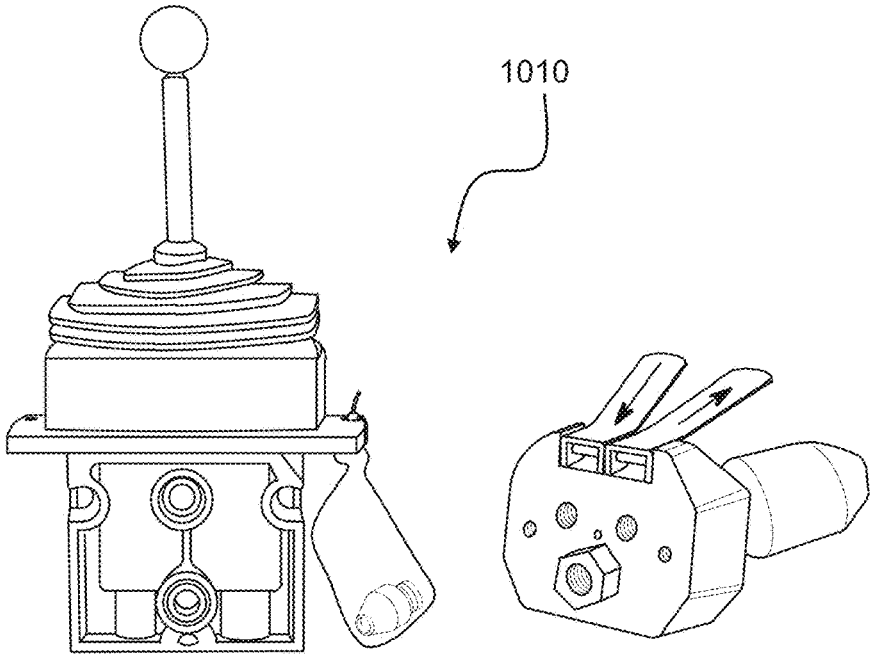
FIG. 35 illustrates an alternative control assembly according to some embodiments for controlling the crawler of FIG. 11.

Alternative to Evaluate:

FIG. 35 illustrates an alternative control assembly 1010 according to some embodiments for controlling the crawler of FIG. 11.

Flow Control (Optional)

Figure 36:
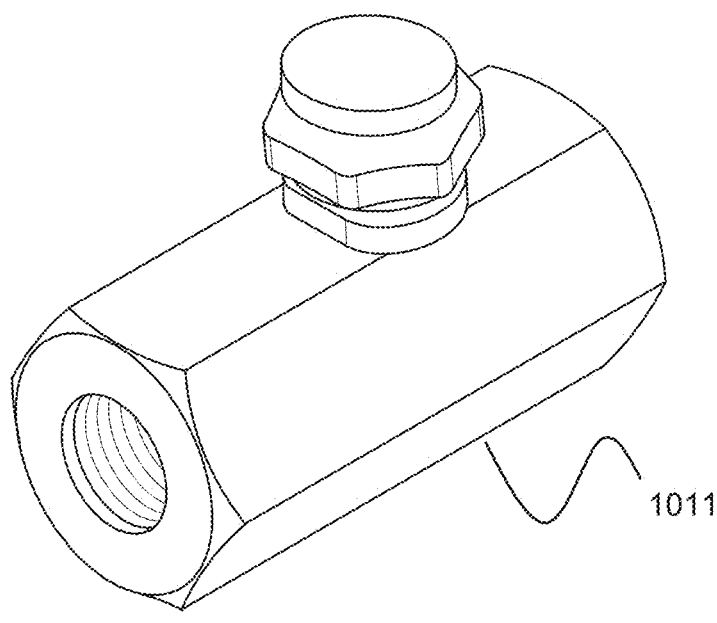
FIG. 36 is a flow control valve according to some embodiments for the pneumatic crawling robot of FIG. 11.
Figure 37:
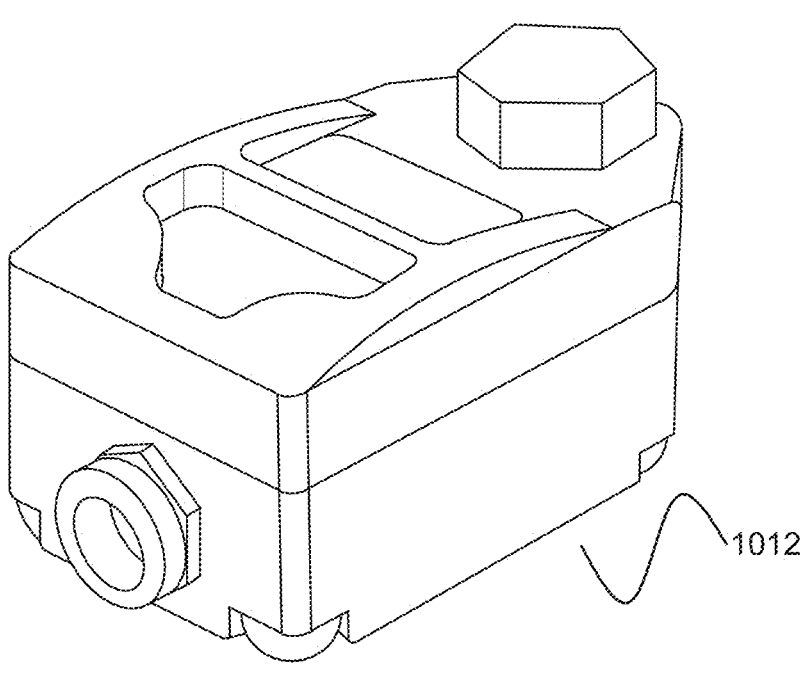
FIG. 37 is a quick exhaust valve according to some embodiments for the pneumatic crawling robot of FIG. 11.
Figure 38:
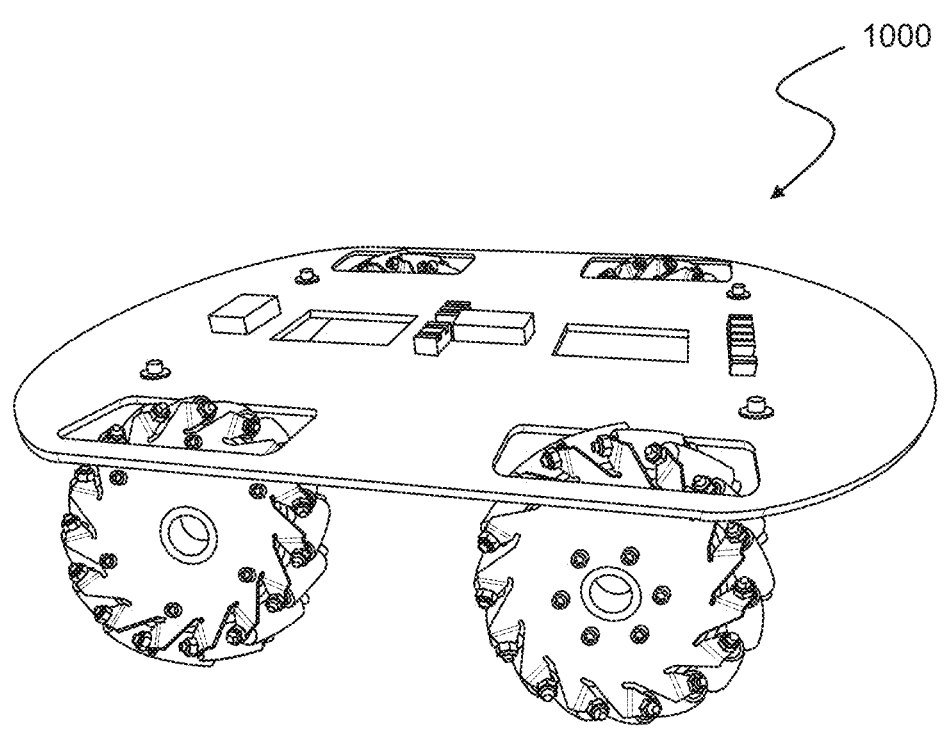
FIGS. 38 and 39 illustrate respective views of a prototype of the crawler of FIG. 11 according to some embodiments.
Figure 39:
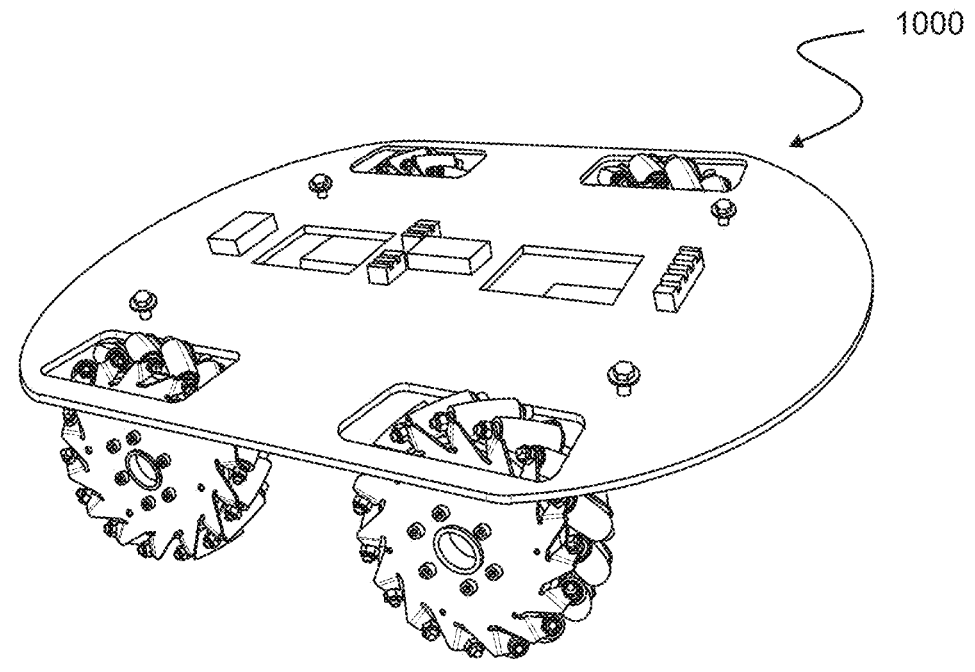

Tubes and compress gas connections according to some embodiments for the crawler of FIG. 11 are as follows: Tubing (12 mm). Tubing (18 mm), Splitter (G½-12 mm), Connector to regulator (G/1-⅜")(female-female) and Regulator. Flow control components according to some embodiments for the crawler of FIG. 11 are as follows: Flow control valve (2×σ¼), Quick exhaust valve (G¼-8 mm) and Connector (G¼ internal-8 mm). FIG. 36 is a flow control valve 1011 according to some embodiments for the pneumatic crawling robot of FIG. 11. FIG. 37 is a quick exhaust valve 1012 according to some embodiments for the pneumatic crawling robot of FIG. 11. This part consists of a flow control valve and a quick exhaust valve, with accompanying connectors to place them in line with the 8 mm tube. The quick exhaust valve should be placed closest to the crawler. This way the flow control valve will not restrict the flow when emptying a tube to change rotation direction Prototype of System FIGS. 38 and 39 illustrate respective views of a prototype of the crawler of FIG. 11 according to some embodiments.

Mecanum Wheels and Directional Control Sequencing

FIG. 40 is a schematic and corresponding table illustrating Mecanum wheels and directional control sequencing according to some embodiments for the crawler of FIG. 11.

Controller

Figure 41:
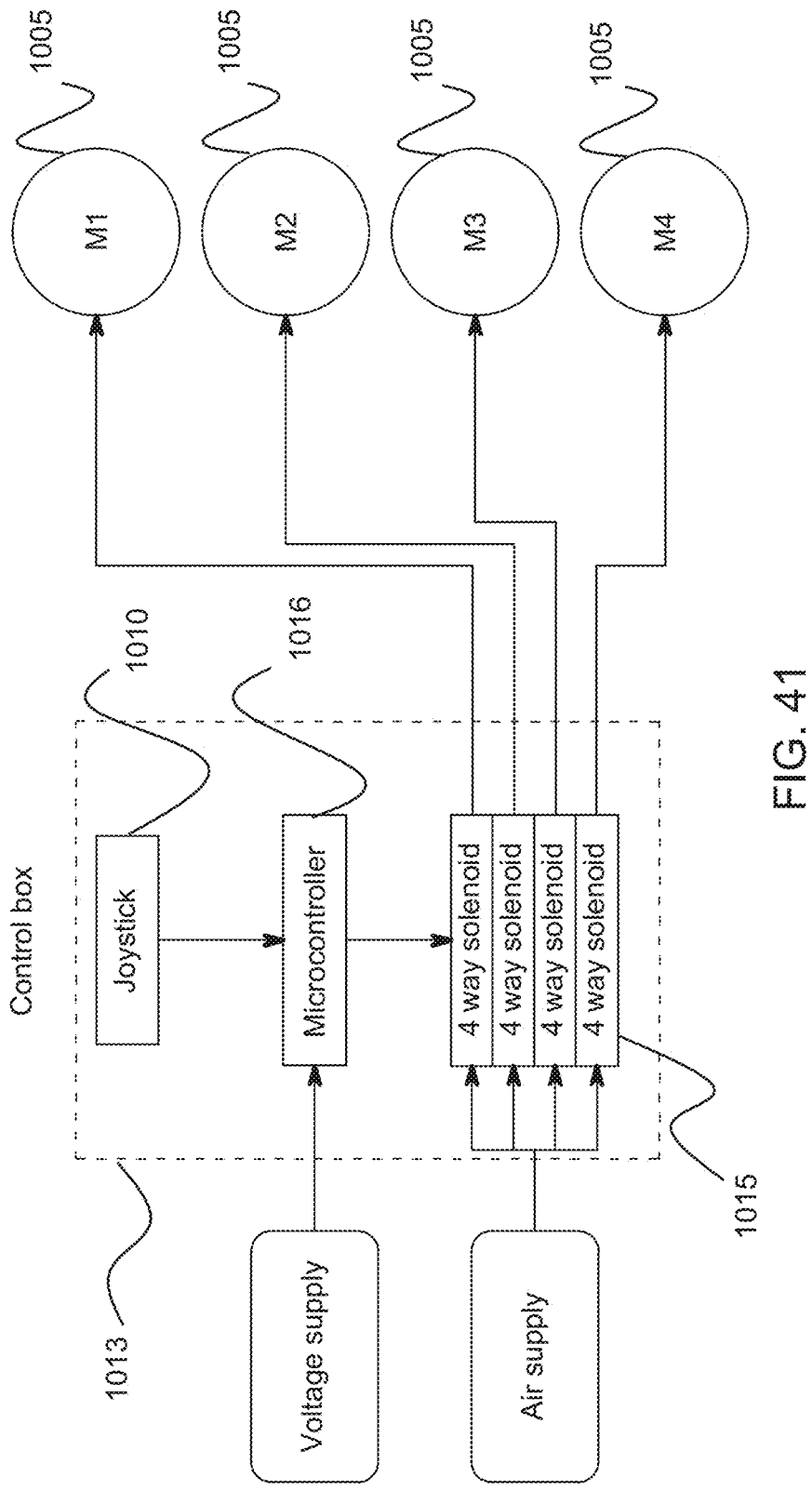
FIG. 41 is a schematic diagram of a controller according to some embodiments for controlling the crawler of FIG. 11.

FIG. 41 is a schematic diagram of a controller 1013 according to some embodiments for controlling the crawler of FIG. 11. A joystick manipulation control system is dispensed through a four four-way solenoid control system 1015 to control flow from the pneumatic motors 1005 to the omnidirectional wheels 1004. Joystick 1010 is operably connected to the four four-way solenoid control system 1015 via a microcontroller 1016.

The automated low-static pneumatic remote controlled robotic crawler for non-destructive testing of hazardous environments of the present disclosure as presented in the FIGS. 10 to 41 generally works by pneumatic power of the wheels for movement of the crawler.

To make the automated pneumatic remote controlled robotic crawler for nondestructive testing of hazardous environments of the present disclosure as presented in the FIGS. 10 to 41, a person would assemble the components according to the illustrations in the accompanying FIGS. 10 to 41.

To use the automated low-static pneumatic remote controlled robotic crawler for non-destructive testing of hazardous environments of the present disclosure as presented in the FIGS. 10 to 41, the valve controls need to be sequenced to allow for omnidirectional movement.

It will be understood that the other aspects and embodiments of the present technology set forth in the specification herein with reference to FIGS. 1 to 9 of the accompanying drawings are in no way limited to the embodiments described with reference to FIGS. 10 to 41.

Notwithstanding the foregoing, it will be understood to the person of ordinary skill in the art that in some alternative aspects of the present technology, apparatus, systems and/methods are provided that include the robotic crawler platform, air logic control system and other apparatus and associated methods of operation and use thereof as shown in the accompanying figures and described but in conjunction with additional electrical components and/or hardware. Whilst the apparatus, systems and/or method of such alternatively aspects may not have the advantages of meeting be capable for use in explosive conditions, they are still improved apparatus/systems and/or methods by virtue of the pneumatic configurations shown and described herein.

While embodiments of the robotic crawler platform system and method have been described in detail, it should be apparent that modifications and variations thereto are possible, all of which fall within the true spirit and scope of one or more embodiments of the present technology. With respect to the above description then, it is to be realized that the optimum dimensional relationships for the parts of one or more embodiments of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although logically controlling a pneumatically driven multidirectional multi-motor crawler platform have been described, it should be appreciated that one or more embodiments of the present technology herein described is also suitable for providing a non-electric control system for controlling multiple pneumatically or hydraulically powered motors in any environment and device or even combined with electrical control systems or components in other applications.

Therefore, the foregoing is considered as illustrative only of the principles of some or all embodiments of the present technology. Further, since numerous modifications and changes will readily occur to those skilled in the art, it is not desired to limit one or more embodiments of the present technology to the exact construction and operation shown and described, and accordingly, all suitable modifications and equivalents may be resorted to, falling within the scope of one or more embodiments of the present technology.

The invention claimed is:

1. An apparatus comprising:

a robotic crawler platform including wheels and pneumatic motors, wherein said pneumatic motors are connected to said wheels; and an air logic control system in fluid communication with said pneumatic motors; and wherein said robotic crawler platform further comprises air logic valves in fluid communication with said pneumatic motors and with said air logic control system;

wherein said air logic valves being in fluid communication with said pneumatic motors and controls fluid entering said pneumatic motors based on a pneumatic signal from said air logic control system;

wherein said air logic valves are multi-direction flow control valves each configured to receive a pneumatic power, to receive a forward pneumatic signal from said air logic control system and to receive a reverse pneumatic signal from said air logic control system; and wherein said multi-direction flow control valves provides the pneumatic power to a forward input of said pneumatic motors upon receiving said forward pneumatic signal and provides the pneumatic power to a reverse input of said pneumatic motors upon receiving said reverse pneumatic signal.

2. The apparatus according to claim 1 further comprises a main pneumatic switch in fluid communication with said pneumatic motors, said main pneumatic switch is configured to control a pneumatic power from a pneumatic source to said pneumatic motors.

3. The apparatus according to claim 1, wherein said robotic crawler platform and said air logic control system are non-electric.

4. The apparatus according to claim 1, wherein said robotic crawler platform and said air logic control system are made from materials having anti-static properties.

5. An apparatus according to claim 1, wherein said air logic control system comprises shuttle valves in fluid communication with said air logic valves, a user input assembly and a pneumatic source.

6. An apparatus comprising:

a robotic crawler platform including wheels and pneumatic motors, wherein said pneumatic motors are connected to said wheels; and an air logic control system in fluid communication with said pneumatic motors;

wherein said robotic crawler platform further comprises air logic valves in fluid communication with said pneumatic motors and with said air logic control system;

wherein said air logic control system comprises shuttle valves in fluid communication with said air logic valves, a user input assembly and a pneumatic source.

7. The apparatus according to claim 6, wherein said user input assembly comprises mechanically actuatable valves that provides pneumatic signals to said air logic valves.

8. The apparatus according to claim 7, wherein said user input assembly further comprises one or more shuttle valves that are in fluid communication with said mechanically actuatable valves and said air logic valves, wherein said shuttle valves are configured to control said pneumatic signals provided to said air logic valves.

9. The apparatus according to claim 8, wherein said air logic valves are multi-direction flow control valves each configured to receive a pneumatic power, to receive a forward pneumatic signal from said air logic control system and to receive a reverse pneumatic signal from said air logic control system.

10. The apparatus according to claim 9, wherein said multi-direction flow control valves provides the pneumatic power to a forward input of said pneumatic motors upon receiving said forward pneumatic signal from a forward shuttle valve and provides the pneumatic power to a reverse input of said pneumatic motors upon receiving said reverse pneumatic signal from a reverse shuttle valve.

11. The apparatus according to claim 10 further comprises a main pneumatic switch in fluid communication with said pneumatic motors, said main pneumatic switch is configured to control the pneumatic power from the pneumatic source to said multi-direction flow control valves.

12. The apparatus according to claim 6, wherein said robotic crawler platform and said air logic control system are non-electric.

13. The apparatus according to claim 6, wherein said robotic crawler platform and said air logic control system are made from materials having anti-static properties.

14. An apparatus comprising:

a robotic crawler platform including wheels and pneumatic motors, wherein said pneumatic motors are connected to said wheels; and an air logic control system in fluid communication with said pneumatic motors;

wherein said air logic control system is in fluid communication with said pneumatic motors by way of one or more static resistant hoses.

15. The apparatus according to claim 14, wherein said robotic crawler platform and said air logic control system are non-electric.

16. An automated low-static pneumatic remote controlled robotic crawler for nondestructive testing of hazardous environments comprising:

a crawler main base unit;

a top plate disposed above the crawler main unit made of anti-static polymer;

axle bushings;

a base block for controls;

four independent omnidirectional Mecanum wheels attached to the crawler main unit via the axle bushings;

pneumatic motor to power the movement;

a frame to which the components attach;

a plurality of valves, hoses; and a joystick manipulation control system dispensed through four four-way solenoid control system to control flow from the pneumatic motor to the omnidirectional wheels.

* * * * *